(12) United States Patent
Ogawa

(10) Patent No.: US 6,286,961 B1
(45) Date of Patent: Sep. 11, 2001

(54) ILLUMINATING OPTICAL SYSTEM AND PROJECTION TYPE DISPLAY

(75) Inventor: Yasunori Ogawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/341,666

(22) PCT Filed: Nov. 2, 1998

(86) PCT No.: PCT/JP98/04966

§ 371 Date: Jul. 19, 1999

§ 102(e) Date: Jul. 19, 1999

(87) PCT Pub. No.: WO99/26102

PCT Pub. Date: May 27, 1999

(30) Foreign Application Priority Data

Nov. 18, 1997 (JP) .................................................. 9-334943
Jun. 24, 1998 (JP) ................................................ 10-195007

(51) Int. Cl.[7] .................................................. G03B 21/14
(52) U.S. Cl. ................................................ 353/38; 353/31
(58) Field of Search .............................. 349/5, 9; 353/20, 353/31, 34, 98, 37, 38

(56) References Cited

U.S. PATENT DOCUMENTS

| | | | |
|---|---|---|---|
| 4,769,750 | * | 9/1988 | Matsumoto et al. .................. 362/268 |
| 4,848,879 | * | 7/1989 | Nishimura et al. .................. 350/353 |
| 5,594,526 | * | 1/1997 | Mori et al. ............................. 355/67 |
| 5,865,521 | * | 2/1999 | Hashizume et al. .................... 353/38 |

FOREIGN PATENT DOCUMENTS 5-346557    12/1993   (JP) .

* cited by examiner

Primary Examiner—Safet Metjahic
Assistant Examiner—Etienne LeRoux
(74) Attorney, Agent, or Firm—Oblon, Spivak, McClelland, Maier & Neustadt, P.C.

(57) ABSTRACT

An illumination system includes a light source and a dividing and superimposing section that divides a light flux emitted from the light source into a plurality of partial light fluxes and causes the plurality of partal light fluxes to be substantially superimposed on an illumination area, so as to enable a light-entering face of a specific optical apparatus to be illuminated as the illumination area. The dividing and superimposing section includes a light flux contraction section having the function of an afocal optical system that changes an incident light flux to an emitting light flux, the emitting light flux having a width narrower than the incident light flux. The afocal optical system accordingly decreases the incident angle of the plurality of partial light fluxes into the illumination area to be superimposed on the illumination area. This arrangement effectively decreases the incident angle into the illumination area without significantly lengthening the optical path between the light source and the illumination area in the illumination system including an optical integrator system.

50 Claims, 15 Drawing Sheets

Fig.3(A-1)
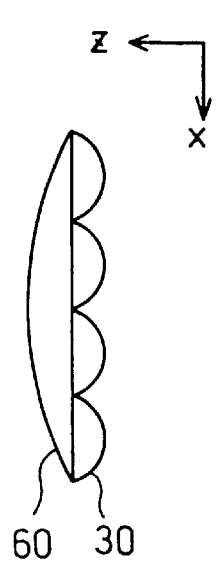
60  30
Fig.3(A-2)
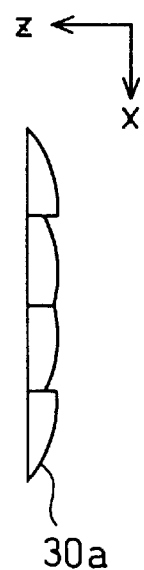
30a
Fig.3(B-1)
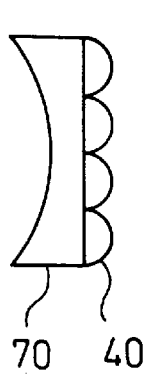
70  40
Fig.3(B-2)
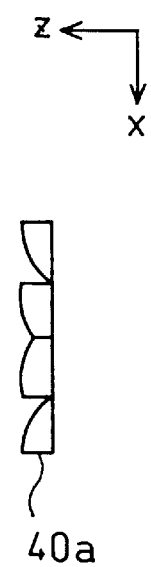
40a

145 REFLECTING FILM
144 POLARIZED LIGHT SEPARATION FILM

ILLUMINATING OPTICAL SYSTEM AND PROJECTION TYPE DISPLAY

BACKGROUND OF THE INVENTION

1. Field of the Invention

The present invention relates to an illumination system that divides a light flux emitted from a light source into a plurality of partial light fluxes and causes the plurality of partial light fluxes to be superimposed on an identical illumination area. The present invention also pertains to a projection display apparatus that produces substantially uniform, bright projected images using such an illumination system.

2. Discussion of the Background

A projection display apparatus uses a light modulator, or 'light valve', to modulate illumination light, illuminating the light modulator, responsive to image information, and projects the modulated light flux on a screen to display an image. A typical example of the light modulator is a liquid-crystal panel. It is naturally desirable that the image displayed by the projection display apparatus is substantially uniform and bright. For that purpose, the illumination light emitted from an illumination device (illumination system) incorporated in the projection display apparatus should have a high utilization efficiency of light. One proposed technique to enhance the utilization efficiency of the illumination light disposes a plurality of micro lenses corresponding to the respective pixels of the liquid-crystal panel on the light-entering side of the liquid-crystal panel.

FIGS. 15(A) and 15(B) show light fluxes entering a liquid-crystal panel in the case where micro lenses are disposed on the light-entering side of the liquid-crystal panel. More concretely FIGS. 15(A) and 15(B) show the cross section of a liquid-crystal panel 1000 and a micro lens array 1100 including a plurality of micro lenses 1110. The liquid-crystal panel 1000 includes liquid-crystal layers 1010 that are surrounded by light shielding layers 1020, which are referred to as the 'black matrixes', in a lattice configuration. The micro lens array 1100 is disposed on the light-entering side of the liquid-crystal panel 1000 in such a manner that the center of one liquid-crystal layer 1010 corresponding to each pixel of the liquid-crystal panel 1000 substantially coincides with the optical axis of one micro lens 1110. As shown in FIG. 15(A), the light flux, which enters the micro lens 1110 substantially in parallel with the optical axis of the micro lens 1110, is condensed by the micro lens 1110 to pass through the liquid-crystal layer 1010. This arrangement ensures the utilization of such light fluxes that would be shielded by the light shielding layers 1020 in the structure without the micro lenses 1110. The micro lenses accordingly work to enhance the utilization efficiency of light.

The micro lens 1110 also condenses the light flux that enters the micro lens 1110 obliquely to the optical axis of the micro lens 1110 as shown in FIG. 15(B). Part of this light flux, however, does not pass through the liquid-crystal layer 1010 but is shielded by the light shielding layer 1020. In this case, the use of the micro lenses worsens the utilization efficiency of light. This phenomenon is more significant in the case of the greater angle of the light flux to the optical axis (that is, the incident angle).

The smaller incident angle of light into the liquid-crystal panel relieves the above problem and improves the utilization efficiency of light. In the structure without micro lenses, the smaller incident angle of light into an optical element other than the liquid-cystal panel (for example, a projection lens for causing the modulated light flux emitted from the liquid-crystal panel to be projected on a screen) would improve the utilization efficiency of light in the optical element and thereby improves the utilization efficiency of light in the whole projection display apparatus.

One possible method of decreasing the incident angle of light into an illumination area is to lengthen the optical path between a light source and the illumination area (especially the optical path between the light source and an optical element immediately before the illumination area). This method, however, undesirably increases the size of the whole illumination system.

In an optical integrator system, a light flux emitted from the light source is divided into a plurality of partial light fluxes, and the plurality of partial light fluxes are superimposed on the illumination area. It is accordingly difficult to decrease the incident angle of light into the illumination area without significantly lengthening the optical path in the illumination system including the optical integrator system.

SUMMARY OF THE INVENTION

The object of the present invention is to solve the above problem arising in the prior art and provide a technique that decreases the incident angle of a light flux into an illumination area without significantly lengthening an optical path between a light source and the illumination area in an illumination system including an optical integrator system.

In order to attain the above object, the present invention is directed to an illumination system that divides a light flux emitted from a light source into a plurality of partial light fluxes and causes the plurality of partial light fluxes to be substantially superimposed on an illumination area, so as to enable a light-entering face of a specific optical apparatus to be illuminated as the illumination area. The illumination system has a light flux contraction section having a function of an afocal optical system that changes an incident light flux to an emitting light flux, the emitting light flux having a width narrower than the incident light flux. The light flux contraction section has a light condensing function and a light parallelizing function to actualize the afocal optical system.

The width of the light flux emitted from the illumination system is contracted by the light flux contraction section having the function of the afocal optical system. This arrangement decreases the incident angle of the light flux that irradiates the illumination area without significantly lengthening the optical path between the light source and the illumination area. The smaller incident angle of the light flux entering an optical element generally results in the better utilization efficiency of light in the optical element. The illumination system of the present invention accordingly improves the utilization efficiency of light.

In accordance with one preferable application of the present invention, the illumination system further includes: a light source that emits a substantially parallel light flux; and a dividing and superimposing section that divides the light flux emitted from the light source into a plurality of partial light fluxes and causes the plurality of partial light fluxes to be substantially superimposed on the illumination area, wherein the light flux contraction section is included in the dividing and superimposing section.

In this preferable structure, the dividing and superimposing section changes the substantially parallel light flux emitted from the light source to a plurality of partial light fluxes having a contracted total width as a whole and causes the plurality of partial light fluxes to be substantially superimposed on the illumination area. This arrangement decreases the incident angle of each partial flux into the illumination area and thereby improves the utilization efficiency of light emitted from the illumination system.

In the illumination system of the above structure, it is preferable that the dividing and superimposing section includes: a first light flux dividing section having the light condensing function and a function of a first lens array having a plurality of small lenses to divide the substantially parallel light flux into the plurality of partial light fluxes; a second light flux dividing section having the light parallelizing function and a function of a second lens array having a plurality of small lenses corresponding to the plurality of small lenses included in the first lens array; and a superimposing section that causes the plurality of partial light fluxes emitted from the second light flux dividing section to be substantially superimposed on the illumination area.

In the illumination system of the present invention, the arrangement of the dividing and superimposing section discussed above enables the total width of the plurality of partial light fluxes emitted from the second light flux dividing section to be contracted by the light flux contraction section. This advantageously decreases the incident angle of the respective partial light fluxes into the illumination area to be superimposed on the illumination area and thereby improves the utilization efficiency of light emitted from the illumination system. This arrangement also reduces the size of the respective constituents between the second light flux dividing section and the superimposing section.

The first light flux dividing section may include the first lens array and a first optical element having the light condensing function, which are manufactured as separate optical elements. The first light flux dividing section may alternatively include one or plural optical elements integrated optically to attain both the function of the first lens array and the light condensing function. Here the term 'optical elements integrated optically' section that the related optical elements are in close contact with each other or that the related optical elements are constructed as one integral optical element having a plurality of functions. The optical elements may be bonded to each other via an adhesive or integrally formed, in order to be integrated optically. The first light flux dividing section may otherwise be constructed as a decentered lens array including a plurality of decentered lenses having both the function of the first lens array and the light condensing function.

The second light flux dividing section may include the second lens array and a second optical element having the light parallelizing function, which are manufactured as separate optical elements. The second light flux dividing section may alternatively include one or plural optical elements integrated optically to attain both the function of the second lens array and the light parallelizing function. The second light flux dividing section may otherwise be constructed as a decentered lens array including a plurality of decentered lenses.

The respective functions of the first light flux dividing section or the second light flux dividing section may be attained by the separate optical elements or by the optically integral configuration. The optically integral configuration effectively prevents the loss of light occurring on the interfaces of the respective optical elements and thereby improves the utilization efficiency of light. This arrangement also reduces the number of the required constituents included in the illumination system.

In accordance with one desirable application of the illumination system having the preferable structure discussed above, the dividing and superimposing section includes a first light flux dividing section and a second light flux dividing section. The first light flux dividing section has the light condensing function, a function of a first lens array having a plurality of small lenses to divide the substantially parallel light flux into the plurality of partial light fluxes, and a function of causing the plurality of partial light fluxes emitted from the first light flux dividing section to be substantially superimposed on the illumination area via the second light flux dividing section. The second light flux dividing section has the light parallelizing function and a function of a second lens array having a plurality of small lenses corresponding to the plurality of small lenses included in the first lens array.

This arrangement of the dividing and superimposing section also enables the width of the light flux emitted from the first light flux dividing section to be contracted by the light flux contraction section. This also decreases the incident angle of the respective partial light fluxes into the illumination area to be superimposed on the illumination area and improves the utilization efficiency of light emitted from the illumination system. The first light flux dividing section has the function of superposition, so that an independent superimposing section is not required and the number of the required constituents included in the illumination system can be reduced.

The first light flux dividing section may include the first lens array, a first optical element having the light condensing function, and a superimposing lens that causes the plurality of partial light fluxes emitted from the first light flux dividing section to be superimposed on the illumination area via the second light flux dividing section, which are manufactured as separate optical elements. The first light flux dividing section may alternatively include one or plural optical elements integrated optically to attain the function of the first lens array, the light condensing function, and the function of causing the plurality of partial light fluxes emitted from the first light flux dividing section to be superimposed on the illumination area via the second light flux dividing section. The first light flux dividing section may otherwise be constructed as a decentered lens array including a plurality of decentered lenses.

The second light flux dividing section may include the second lens array and a second optical element having the light parallelizing function, which are manufactured as separate optical elements. The second light flux dividing section may alternatively include one or plural optical elements integrated optically to attain both the function of the second lens array and the light parallelizing function. The second light flux dividing section may otherwise be constructed as a decentered lens array including a plurality of decentered lenses.

The respective functions of the first light flux dividing section or the second light flux dividing section may be attained by the separate optical elements or by the optically integral configuration. The optically integral configuration effectively prevents the loss of light occurring on the interfaces of the respective optical elements and thereby improves the utilization efficiency of light. This arrangement also reduces the number of the required constituents included in the illumination system.

In accordance with another desirable application of the illumination system having the preferable structure discussed above, the dividing and superimposing section includes: a first light flux dividing section and a second light flux dividing section that divide the substantially parallel light flux emitted from the light source into the plurality of partial light fluxes; and a superimposing section that causes the plurality of partial light fluxes to be substantially superimposed on the illumination area, wherein the light flux contraction section is disposed on an optical path between the light source and a light-emitting face of the first light flux dividing section.

In this structure, a first optical element having the light condensing function is disposed in the middle of the light source and the first light flux dividing section, and the first light flux dividing section has the light parallelizing function.

The arrangement of the dividing and superimposing section discussed above enables the total width of the plurality of partial light fluxes emitted from the first light flux dividing section to be contracted by the light flux contraction section. This advantageously decreases the incident angle of the respective partial light fluxes into the illumination area to be superimposed on the illumination area and thereby improves the utilization efficiency of light emitted from the illumination system. This arrangement also ensures the size reduction of the respective constituents between the first light flux dividing section and the superimposing section.

The first light flux dividing section may be one optical element having the light parallelizing function. The first light flux dividing section may alternatively be constructed as a decentered lens array including a plurality of decentered lenses. This arrangement effectively prevents the loss of light occurring on the interfaces of the respective optical elements and thereby improves the utilization efficiency of light. This arrangement also reduces the number of the required constituents included in the illumination system.

In accordance with still another desirable application of the illumination system having the preferable structure discussed above, the dividing and superimposing section includes: a first light flux dividing section and a second light flux dividing section that divide the substantially parallel light flux emitted from the light source into the plurality of partial light fluxes; and a superimposing section that causes the plurality of partial light fluxes to be substantially superimposed on the illumination area, wherein the light flux contraction section is disposed on an optical path between a light-entering face of the second light flux dividing section and a light-emitting face of the superimposing section.

In this structure, the second light flux dividing section has the light condensing function, whereas the superimposing section has the light parallelizing function.

The arrangement of the dividing and superimposing section discussed above enables the total width of the plurality of partial light fluxes emitted from the superimposing section to be contracted by the light flux contraction section, which is disposed on the optical path between the light-entering face of the second light flux dividing section and the light-emitting face of the superimposing section. This advantageously decreases the incident angle of the respective partial light fluxes into the illumination area to be superimposed on the illumination area and thereby improves the utilization efficiency of light emitted from the illumination system.

The first light flux dividing section may be one optical element having the light condensing function, and the superimposing section may be one optical element having the light parallelizing function. This arrangement effectively prevents the loss of light occurring on the interfaces of the respective optical elements and thereby improves the utilization efficiency of light. This arrangement also reduces the number of the required constituents included in the illumination system.

In accordance with another desirable application of the illumination system having the preferable structure discussed above, the dividing and superimposing section includes: a first light flux dividing section and a second light flux dividing section that divide the substantially parallel light flux emitted from the light source into the plurality of partial light fluxes; and a superimposing section that causes the plurality of partial light fluxes to be substantially superimposed on the illumination area, wherein the light flux contraction section is disposed on an optical path between a light-entering face of the superimposing section and the illumination area.

In this structure, the superimposing section has the light condensing function, and a second optical element having the light parallelizing function is disposed in the middle of the superimposing section and the illumination area.

The arrangement of the dividing and superimposing section discussed above enables the total width of the plurality of partial light fluxes emitted from the superimposing section to be contracted by the light flux contraction section, which is disposed on the optical path between the light-entering face of the superimposing section and the illumination area. This advantageously decreases the incident angle of the respective partial light fluxes into the illumination area to be superimposed on the illumination area and thereby improves the utilization efficiency of light emitted from the illumination system.

The superimposing section may be one optical element having the light condensing function. This arrangement effectively prevents the loss of light occurring on the interfaces of the respective optical elements and thereby improves the utilization efficiency of light. This arrangement also reduces the number of the required constituents included in the illumination system.

In accordance with another preferable application of the present invention, the illumination system further includes: a light source that has a reflector as a first optical element having the light condensing function and that emits a convergent light flux; and a dividing and superimposing section that divides the convergent light flux into a plurality of partial light fluxes and causes the plurality of partial light fluxes to be substantially superimposed on the illumination area, wherein the dividing and superimposing section has the light parallelizing function.

In the illumination system of the above configuration, the dividing and superimposing section divides the convergent light flux emitted from the light source into a plurality of partial light fluxes having a contracted total width and causes the plurality of partial light fluxes having the contracted total width to be superimposed on the illumination area. This arrangement decreases the incident angle of the respective partial light fluxes into the illumination area and thereby improves the utilization efficiency of light emitted from the illumination system.

In this illumination system, it is preferable that the dividing and superimposing section includes: a first light flux dividing section and a second light flux dividing section that divide the convergent light flux into a plurality of partial light fluxes; and a superimposing section that causes the plurality of partial light fluxes to be substantially superimposed on the illumination area, wherein the first light flux dividing section has the light parallelizing function.

The arrangement of the dividing and superimposing section discussed above enables the total width of the plurality of partial light fluxes emitted from the first light flux dividing section to be contracted by the light flux contraction section, which is attained by the reflector of the light source and the light parallelizing function. This advantageously decreases the incident angle of the respective partial light fluxes into the illumination area to be superimposed on the illumination area and thereby improves the utilization efficiency of light emitted from the illumination system. This arrangement also ensures the size reduction of the respective constituents between the first light flux dividing section and the superimposing section.

The first light flux dividing section may be one optical element having the light parallelizing function. The first light flux dividing section may alternatively be constructed as a decentered lens array including a plurality of decentered lenses. This arrangement effectively prevents the loss of light occurring on the interfaces of the respective optical elements and thereby improves the utilization efficiency of light. This arrangement also reduces the number of the required constituents included in the illumination system.

In the illumination system of the above structure, it is preferable that the dividing and superimposing section includes: a first light flux dividing section and a second light flux dividing section that divide the convergent light flux into a plurality of partial light fluxes; and a superimposing section that causes the plurality of partial light fluxes to be substantially superimposed on the illumination area, wherein the second light flux dividing section has the light parallelizing function.

The arrangement of the dividing and superimposing section discussed above enables the total width of the plurality of partial light fluxes emitted from the second light flux dividing section to be contracted by the light flux contraction section, which is attained by the reflector of the light source and the light parallelizing function. This advantageously decreases the incident angle of the respective partial light fluxes into the illumination area to be superimposed on the illumination area and thereby improves the utilization efficiency of light emitted from the illumination system. This arrangement also ensures the size reduction of the respective constituents between the second light flux dividing section and the superimposing section.

The second light flux dividing section may be one optical element having the light parallelizing function. The second light flux dividing section may alternatively be constructed as a decentered lens array including a plurality of decentered lenses. This arrangement effectively prevents the loss of light occurring on the interfaces of the respective optical elements and thereby improves the utilization efficiency of light. This arrangement also reduces the number of the required constituents included in the illumination system.

The illumination system having any one of the above structures may further include: a polarized light generator that is disposed at a specific position in the illumination system to convert light fluxes having random polarizing directions into one type of polarized light fluxes having a substantially identical polarizing direction and emit the one type of polarized light fluxes. The polarized light generator has: a polarized light splitter that separates an incident light flux into two different types of polarized light fluxes having different polarizing directions; and a polarized light converter that convert the polarizing direction of one type of polarized light flux identical with the polarizing direction of the other type of polarized light flux obtained by the polarized light splitter, wherein the illumination area is irradiated with the single type of polarized light fluxes having the substantially identical polarizing direction, which is obtained by the polarized light converter.

This arrangement enables substantially one type of polarized light fluxes having an identical polarizing direction to be used as the illumination light, thereby improving the utilization efficiency of light when the illumination system is incorporated in a projection display apparatus as discussed below.

Each of the above illumination systems according to the present invention may be used as an illumination system of a projection display apparatus. The present invention is accordingly directed to a projection display apparatus, which includes any one of the illumination systems according to the present invention; a light modulator that modulates light emitted from the illumination system according to image information; and a projection optical system that projects a modulated light flux obtained by the light modulator on a projection surface.

As described previously, the illumination system of the present invention decreases the incident angle of light fluxes that irradiate the light modulator, which is the illumination area. This improves the utilization efficiency of light emitted from the illumination system. The projection display apparatus with the illumination system of the present invention incorporated therein accordingly enhances the brightness of projected images.

The illumination system of the present invention has an optical integrator system. Even in the event that the light flux emitted from the light source has a significant polarization in distribution of light intensity in the cross section of the light flux, the optical integrator system ensures the illumination light having the substantially uniform brightness and being free from the color unevenness. The resulting projected image accordingly has the substantially uniform brightness and is free from the color unevenness over the whole projection surface.

The illumination system of the present invention having the polarized light generator, which includes the polarized light splitter and the polarized light converter, further exerts the effects discussed below.

A liquid-crystal panel used as the light modulator utilizes the light flux after the polarized light fluxes of different polarizing directions that are not required for display are absorbed by a polarized light selection section, such as a polarizer. This significantly lowers the utilization efficiency of light. In the case where the polarizer is used as the polarized light selection section, the absorption of light remarkably increases the temperature of the polarizer and thereby requires a large-scaled cooling device for cooling the polarizer down. The polarized light generator of the present invention changes the light fluxes that are emitted from the light source and have random polarizing directions to substantially one type of polarized light fluxes having an identical polarizing direction. Only the substantially one type of polarized light fluxes having an identical polarizing direction may thus be used as the illumination light for the light modulator. This arrangement enables most of the light flux emitted from the light source to be utilized and gives extremely bright projected images. The illumination light hardly includes the polarized light fluxes of different polarizing directions that are not required for display. There is thus significantly little light absorption by the polarizer. This prevents the temperature increase of the polarizer and simplifies the cooling device.

In accordance with one preferable application of the present invention, the projection display apparatus further includes: a color separator that divides the light flux emitted from the illumination system into at least two color light fluxes; a plurality of the light modulators that respectively modulate the color light fluxes separated by the color separator; and a color combiner that combines the modulated color light fluxes together after the modulation in the plurality of light modulators, wherein a composite light flux obtained by the color combiner is projected via the projection optical system.

This arrangement of the projection display apparatus enables an extremely bright, uniform, and even color image to be projected and displayed.

BRIEF DESCRIPTION OF THE DRAWINGS

FIGS. 3(A-1), 3(A-2), 3(B-1) and 3(B-2) shows other possible configurations of the first lens array 30 and the condenser lens 60 and other possible configurations of the second lens array 40 and the diverging lens 70 in the first embodiment;

DETAILED DESCRIPTION OF THE PREFERRED EMBODIMENTS

Figure 1:
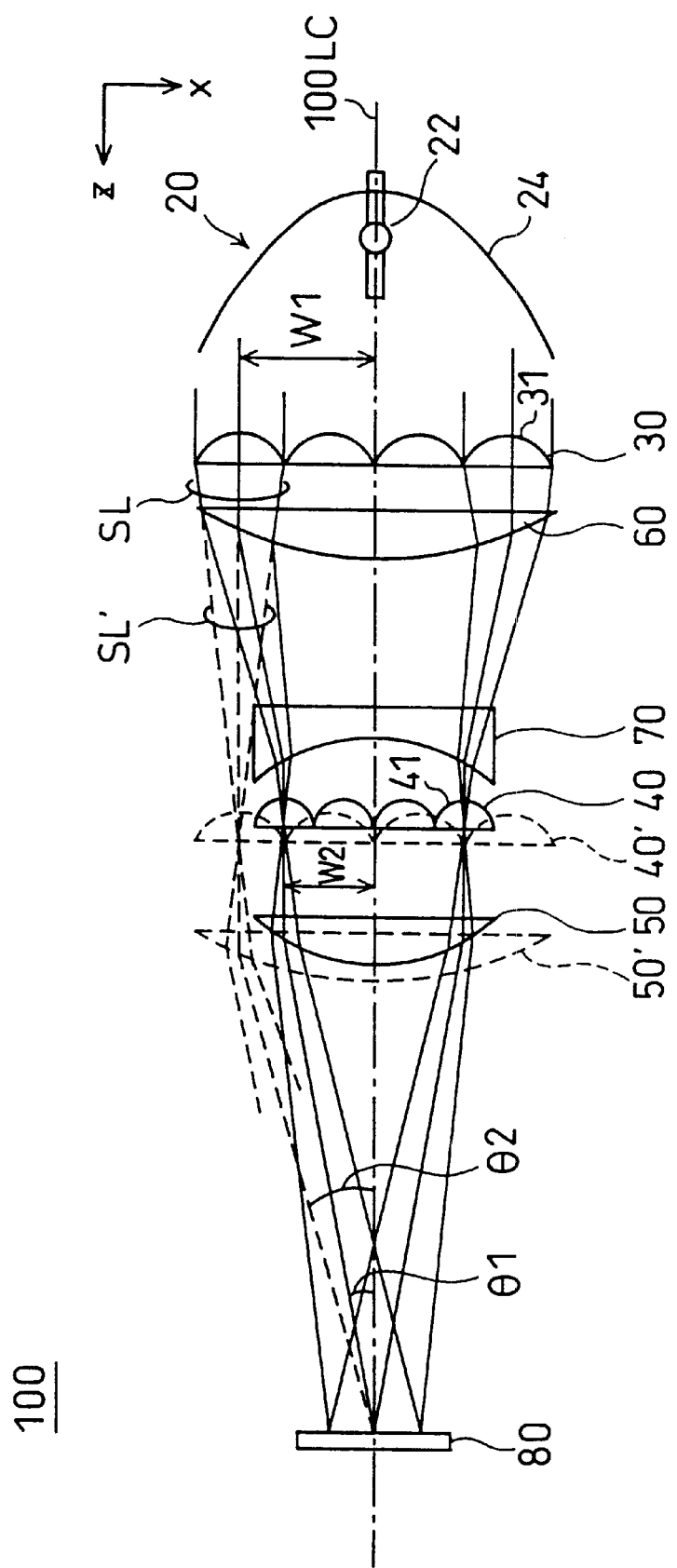
FIG. 1 is a plan view schematically illustrating a main part of an illumination system in a first embodiment according to the present invention.

Embodiments of the present invention are discussed below with referring to the drawings. In the embodiments discussed below, as a matter of convenience, the three directions mutually perpendicular to one another are called x-axis direction (the lateral direction), y-axis direction (the vertical direction), and z-axis direction (the direction in parallel to the optical axis), unless otherwise specified.

A. First Embodiment

FIG. 1 is a plan view schematically illustrating a main part of an illumination system in a first embodiment according to the present invention. This illumination system 100 includes a light source 20 that emits a substantially parallel light flux a first lens array 30, a condenser lens 60, a diverging lens 70, a second lens array 40, and a superimposing lens 50. The respective constituents are arranged in this sequence along a system optical axis 100LC. The illumination system 100 is an optical integrator system that enables an illumination area 80 to be illuminated in a substantially uniform manner.

The light source 20 includes a light source lamp 22, which functions as a radiant light source for emitting radiant rays, and a concave mirror 24, which changes the radiant rays emitted from the light source lamp 22 to a substantially parallel light flux. A paraboloidal mirror is preferably used for the concave mirror 24.

The functions of the optical integrator system are actualized by the first lens array 30, the second lens array 40, and the superimposing lens 50 among these constituents. The first lens array 30 and the second lens array 40 have the function of the light flux dividing section of the present invention. The first lens array 30 divides a ray of light emitted from the light source 20 into a plurality of partial light fluxes and condenses each partial light flux in the vicinity of the second lens array 40. The second lens array 40 causes the illumination area 80 to be illuminated with rays of light emitted from respective small lenses 31 included in the first lens array 30. The superimposing lens 50 causes the plurality of partial light fluxes having the center axes in parallel to the system optical axis to be superimposed on the illumination area 80.

Figure 2:
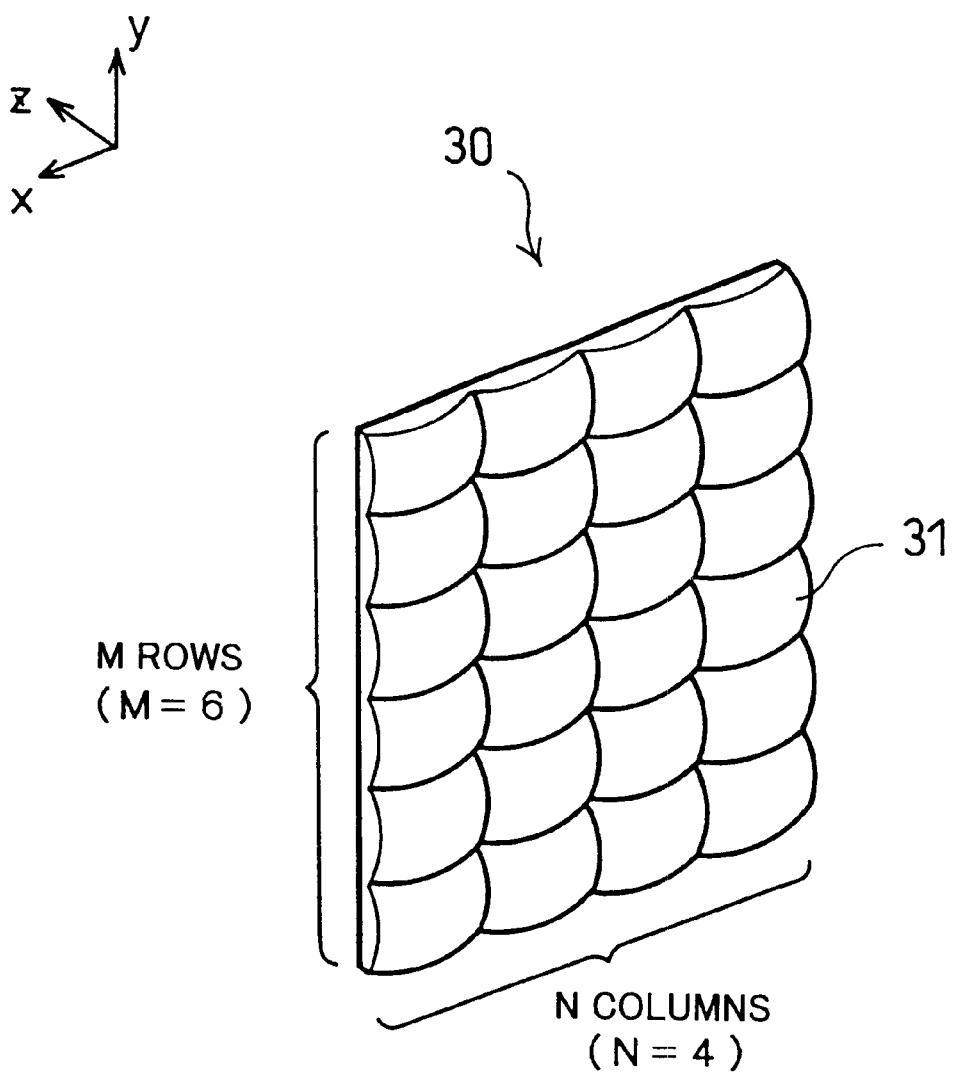
FIG. 2 is a perspective view illustrating the appearance of the first lens array 30.

FIG. 2 is a perspective view illustrating the appearance of the first lens array 30. The first lens array 30 consists of the small lenses 31 that have the contour of a substantially rectangular shape and are arranged in an M×N matrix. In the example of FIG. 2, M=6 and N=4. The second lens array 40 (see FIG. 1) also consists of small lenses, which are arranged in an M×N matrix corresponding to the small lenses 31 of the first lens array 30. The second lens array 40 is smaller than the first lens array 30 in size as described later.

The small lenses 31 included in the first lens array 30 divide the light flux emitted from the light source 20 (see FIG. 1) into a plurality of (that is, M×N) partial light fluxes and cause the respective partial light fluxes to be condensed in the vicinity of the second lens array 40. The outer shape of each small lens 31 seen from the z direction is typically set to be substantially similar to the shape of a specific area that is actually illuminated with rays of light in the illumination area 80. By way of example, when the illumination area is a liquid-crystal panel and an image display area has an aspect ratio (that is, a ratio of a lateral dimension to a vertical dimension) of 4 to 3, the small lenses 31 have the aspect ratio of 4 to 3.

The condenser lens 60 and the diverging lens 70, which are interposed between the first lens array 30 and the second lens array 40, constitute an afocal optical system that changes an incident light flux having a specific width to an emitting light flux having a width narrower than the specific width. These lenses 60 and 70 correspond to the light flux contraction section of the present invention. Since the condenser lens 60 and the diverging lens 70 constitute the afocal optical system, the angle of the emitting light flux from the diverging lens 70 is identical with the angle of the incident light flux into the condenser lens 60, while only the width of the light flux is contracted. Each partial light flux SL emitted from the diverging lens 70 is transmitted through the second lens array 40 and irradiates the illumination area 80 by section of the superimposing lens 50. The partial light flux SL that is transmitted through an outer-most small lens 41 included in the second lens array 40 has its central optical path at an incident angle of θ1, when irradiating the illumination area 80.

The broken lines of FIG. 1 represent a second lens array 40' and a superimposing lens 50', which would be used in the absence of the afocal optical system, and also the optical path of a partial light flux SL' transmitted through the second lens array 40' and the superimposing lens 50'. The second lens array 40' has the same size as that of the first lens array 30. Although the second lens array 40' and the superimposing lens 50' are a little shifted in the z-axis direction in FIG. 1 for the clarity of illustration, they would be actually located at the same positions in the z-axis direction as those of the second lens array 40 and the superimposing lens 50. The partial light flux SL' emitted from the outer-most small lens 31 included in the first lens array 30 has its central optical path at an incident angle of θ2, while irradiating the illumination area 80.

As discussed in the prior art, in the case where optical elements, such as micro lenses, are disposed on the side of the incident surface of the illumination area 80, the smaller incident angle into the micro lenses improves the utilization efficiency of light. A typical technique adopted to decrease the incident angle of the light flux into the illumination area in the illumination system (that is, in the optical integrator system) is to increase the distance between the illumination system and the illumination area. This technique, however, undesirably makes the whole system bulky. The longer optical path of the illumination system leads to a significant loss of light. The arrangement of this embodiment utilizes the afocal optical system, which includes the condenser lens 60 and the diverging lens 70, to contract the total width of the light flux as a whole. Even if the distance between the second lens array 40 and the illumination area 80 is identical with the distance between the second lens array 40' and the illumination area 80, the incident angle θ1 is accordingly smaller than the incident angle θ2. The use of the optical elements that cause the rays of light to enter the illumination area 80 improves the efficiency of light that effectively irradiates the illumination area 80 without making the whole system undesirably bulky, compared with the prior art illumination system. The light flux emitted from the afocal optical system has the contracted total width as a whole, and the optical elements located after the afocal optical system can thus be reduced in size.

FIGS. 3(A-1), 3(A-2), 3(B-1) and 3(B-2) show other possible configurations of the first lens array 30 and the condenser lens 60 and other possible configurations of the second lens array 40 and the diverging lens 70 in the first embodiment. Although the first lens array 30 and the condenser lens 60 are arranged separately in the example of FIG. 1, the first lens array 30 and the condenser lens 60 may be optically integrated. By way of example, as shown in FIG. 3(A-1), the first lens array 30 and the condenser lens 60, which are manufactured as independent optical elements, may be bonded to each other via an adhesive to be optically integrated. One integral optical element having both the functions of the first lens array 30 and the condenser lens 60 may alternatively be formed. For example, the first lens array 30 and the condenser lens 60 may be formed integrally as a decentered lens array 30a having both the functions of the first lens array 30 and the condenser lens 60 as shown in FIG. 3(A-2). The arrangement of optically integrating the first lens array 30 and the condenser lens 60 as shown in FIGS. 3(A-1) and 3(A-2) effectively reduces the loss of light occurring on the interfaces of the respective optical elements and further enhances the utilization efficiency of light. The positional relationship between the first lens array 30 and the condenser lens 60 and the orientations of these lenses 30 and 60 (that is, whether each of the convex faces thereof is directed to the light source or to the illumination area) may be reversed from those shown in FIG. 1 and FIGS. 3(A-1) and 3(A-2).

In a similar manner, the second lens array 40 and the diverging lens 70, which are arranged separately in the example of FIG. 1, may be integrated optically. By way of example, as shown in FIG. 3(B-1), the second lens array 40 and the diverging lens 70, which are manufactured as independent optical elements, may be bonded to each other via an adhesive to be optically integrated. One integral optical element having both the functions of the second lens array 40 and the diverging lens 70 may alternatively be formed. For example, the second lens array 40 and the diverging lens 70 may be formed integrally as a decentered lens array 40a having both the functions of the second lens array 40 and the diverging lens 70 as shown in FIG. 3(B-2). The arrangement of optically integrating the second lens array 40 and the diverging lens 70 as shown in FIGS. 3(B-1) and 3(B-2) effectively reduces the loss of light occurring on the interfaces of the respective optical elements and further enhances the utilization efficiency of light. The positional relationship between the second lens array 40 and the diverging lens 70 and the orientations of these lenses 40 and 70 (that is, whether the convex face or the concave face thereof is directed to the light source or to the illumination area) may be reversed from those shown in FIG. 1 and FIGS. 3(B-1) and 3(B-2).

Figure 4:
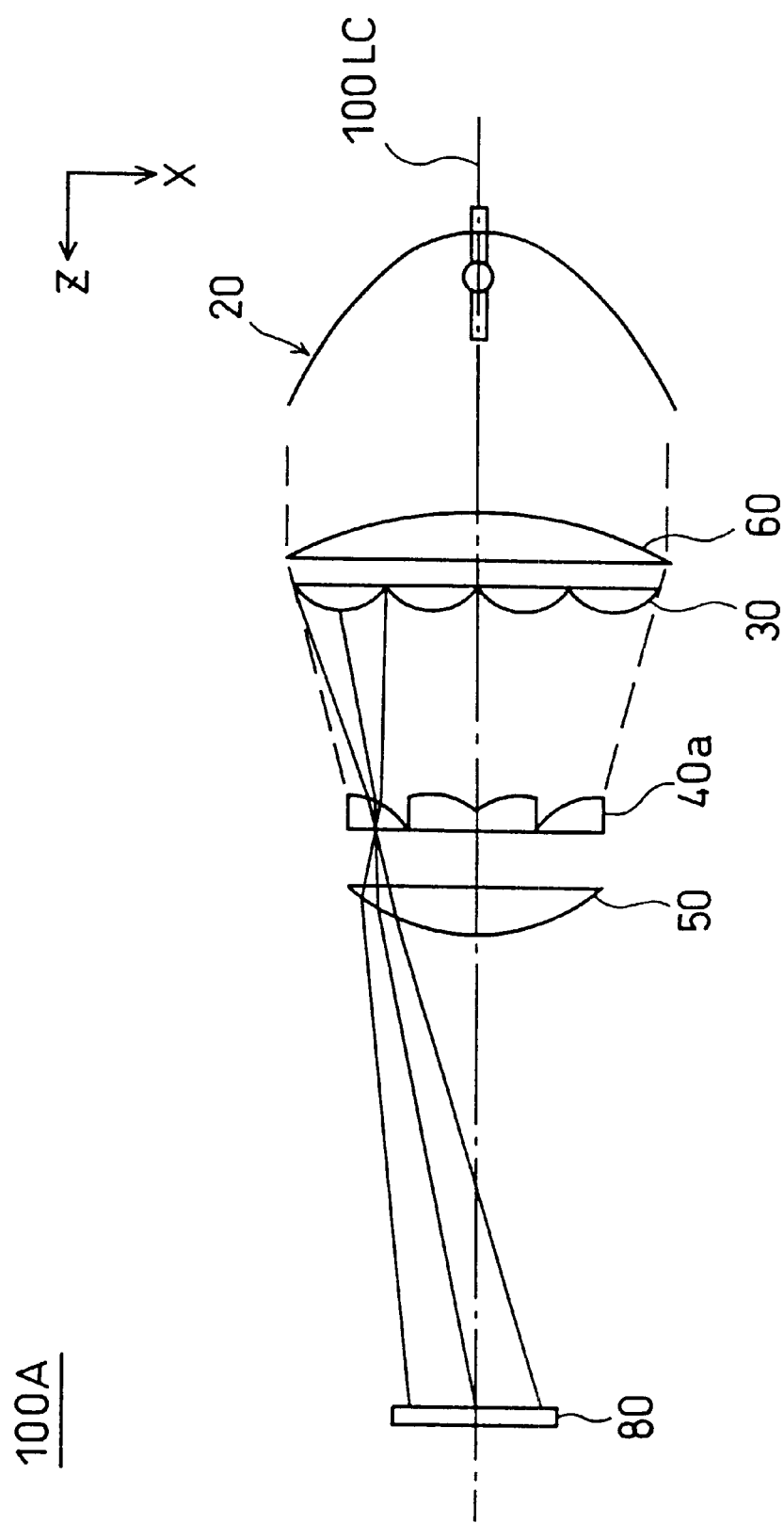
FIG. 4 schematically illustrates a possible modification of the illumination system of the first embodiment.

FIG. 4 schematically illustrates a possible modification of the illumination system of the first embodiment. In an illumination system 100A, the condenser lens 60 and the first lens array 30 are arranged in the reverse sequence to that in the illumination system 100 (see FIG. 1), and the orientations of the convex faces of these lenses 30 and 60 are reverse to those in the illumination system 100. In the illumination system 100A, the second lens array 40 and the diverging lens 70 are replaced by the decentered lens array 40a, and the convex face of the decentered lens array 40a is directed to the light-entering side. The first lens array 30 and the condenser lens 60 may be bonded to each other via an adhesive as shown in FIG. 3(A-1) or alternatively may be formed integrally.

Like the illumination system 100, the illumination system 100A can decrease the incident angle into the illumination area without significantly lengthening the optical path between the light source and the illumination area. This arrangement improves the efficiency of light that effectively irradiates the illumination area. In the illumination system 100A, the condenser lens 60 changes the ray of light emitted from the light source 20 to a condensed ray of light (shown by the broken line in FIG. 4), which can enter the decentered lens array 40a. The first lens array 30 divides the condensed ray of light emitted from the condenser lens 60 into a plurality of partial light fluxes. This arrangement advantageously shortens the distance between the first lens array 30 and the decentered lens array 40a, compared with the distance between the first lens array 30 and the second lens array 40 in the first embodiment. This arrangement also favorably improves the efficiency of light that is emitted from the light source 20 and enters the decentered lens array 40a, compared with the efficiency of light that is emitted from the light source 20 and enters the second lens array 40 in the illumination system 100.

Figure 5:
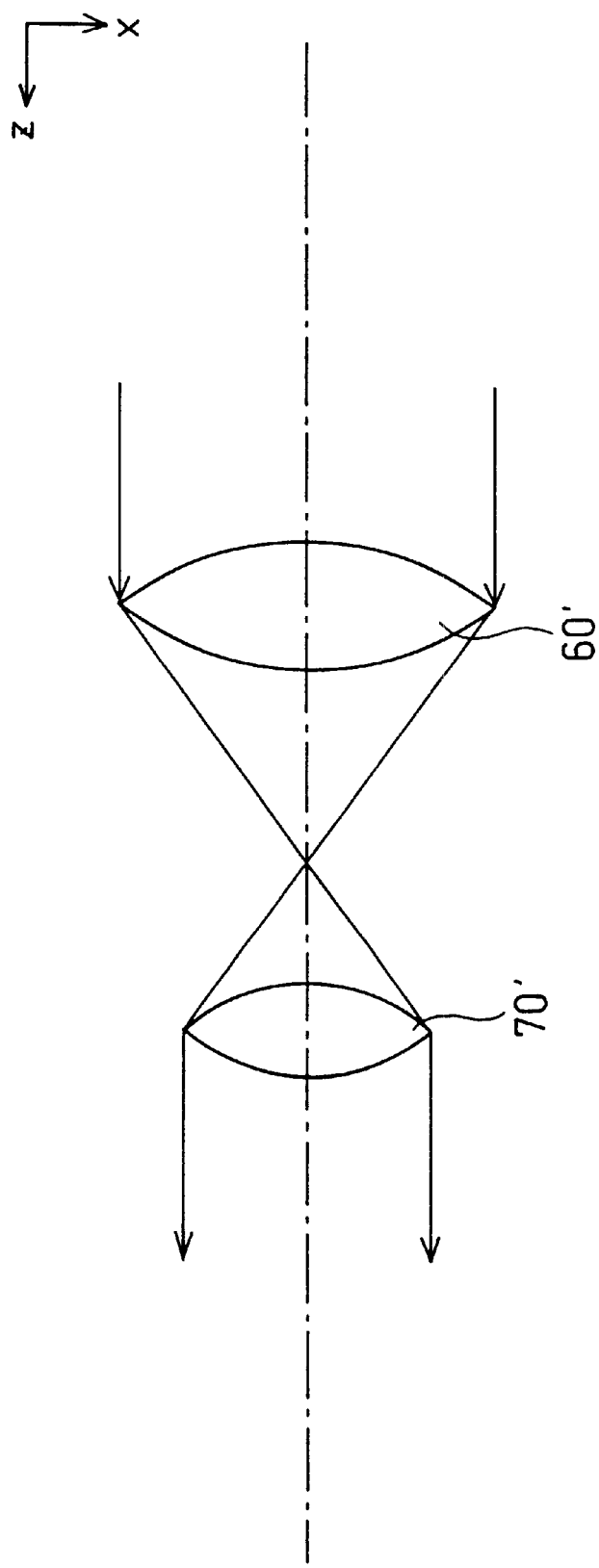
FIG. 5 shows another possible configuration of the afocal optical system.

In the first embodiment shown in FIG. 1, the condenser lens 60 and the diverging lens 70 constitute the afocal optical system. In accordance with another possible application, other optical elements may be used to constitute an afocal optical system. FIG. 5 shows another possible configuration of the afocal optical system. In the example of FIG. 5, the afocal optical system includes a convex lens 60' having a relatively long focal length and another convex lens 70' having a relatively short focal length.

The modifications discussed above, for example, the reversed positional relationship between the adjoining lenses and the optical integration of the separate optical elements, may also be applied to other embodiments described below. The modified configuration of the afocal optical system as shown in FIG. 5 is also applicable to the other embodiments.

B. Second Embodiment

Figure 6:
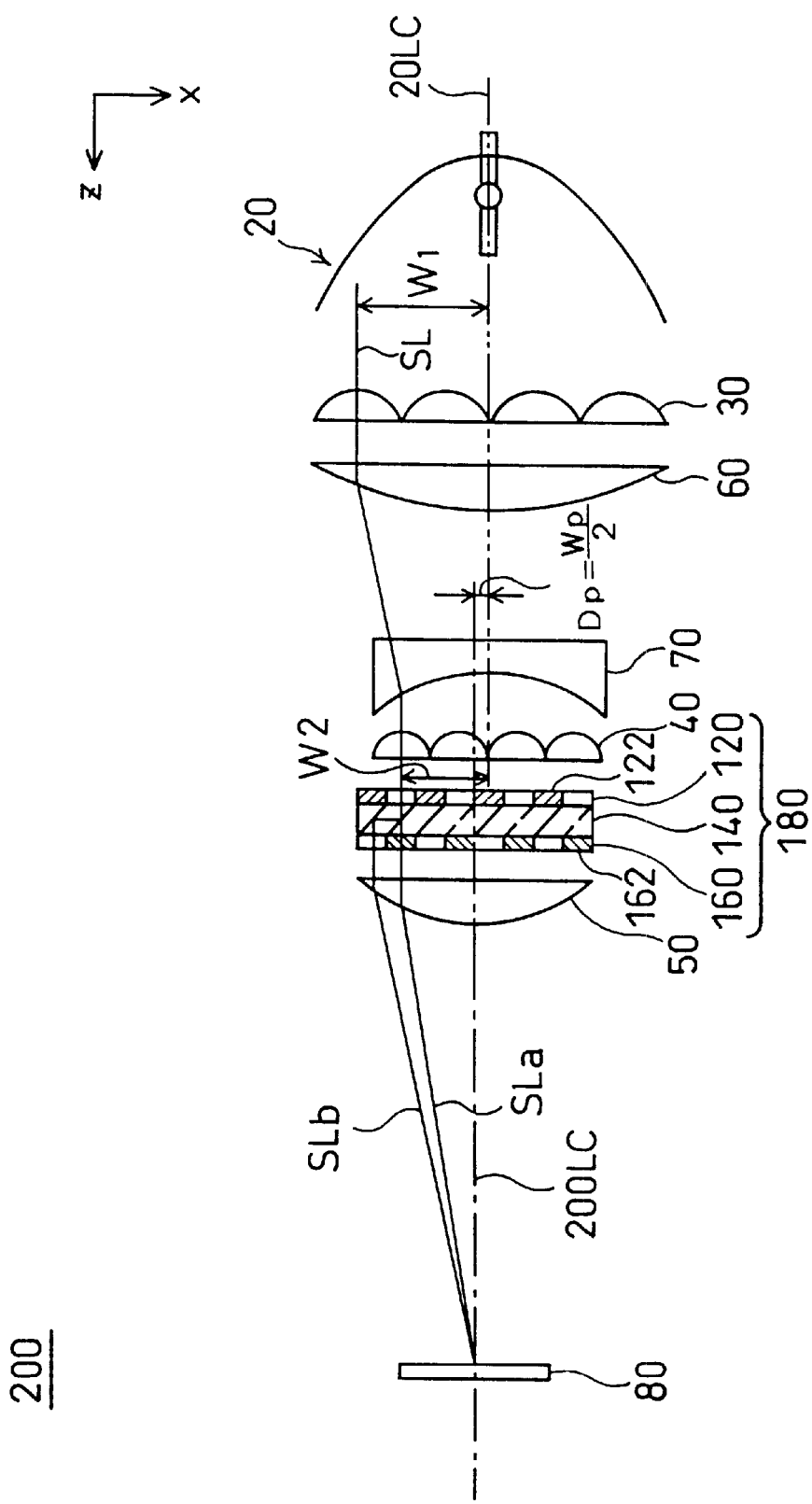
FIG. 6 is a plan view schematically illustrating a main part of a polarized light illumination system, which replaces the illumination system 100.

The illumination system 100 of the first embodiment shown in FIG. 1 may be constructed as a polarized light illumination system that utilizes only one type of polarized light fluxes. FIG. 6 is a plan view schematically illustrating a main part of a polarized light illumination system, which replaces the illumination system 100, in a second embodiment according to the present invention. The illumination system 200 of the second embodiment has a similar structure to that of the illumination system 100 shown in FIG. 1. The difference from the illumination system 100 is that a polarized light generator 180 is located between the second lens array 40 and the superimposing lens 50. For the clarity of explanation, only the central optical path of each light flux is illustrated, unless otherwise specified.

In the illumination system 200 of the second embodiment, the light flux emitted from the light source 20 is divided by the first lens array 30 into a plurality of partial light fluxes, which are contracted in total width by the condenser lens 60 and the diverging lens 70 and eventually emitted from the second lens array 40. The plurality of partial light fluxes, which are emitted from the second lens array 40 and have random polarizing directions, are converted into substantially one type of polarized light fluxes, which have a substantially identical polarizing direction, by the polarized light generator 180 as described later. The plurality of partial light fluxes having the substantially identical polarizing direction are superimposed on the illumination area 80 by section of the superimposing lens 50. Like the illumination system 100 discussed above, the arrangement of the illumination system 200 preferably decreases the incident angle of the illumination light that irradiates the illumination area 80. In the illumination system 200, the light source 20, the first lens array 30, the condenser lens 60, the diverging lens 70, and the second lens array 40 are arranged in such a manner that an optical axis 20LC thereof is shifted in parallel from a system optical axis 200LC in the x-axis direction by a fixed distance Dp. The fixed distance Dp will be discussed later.

Figure 7A:
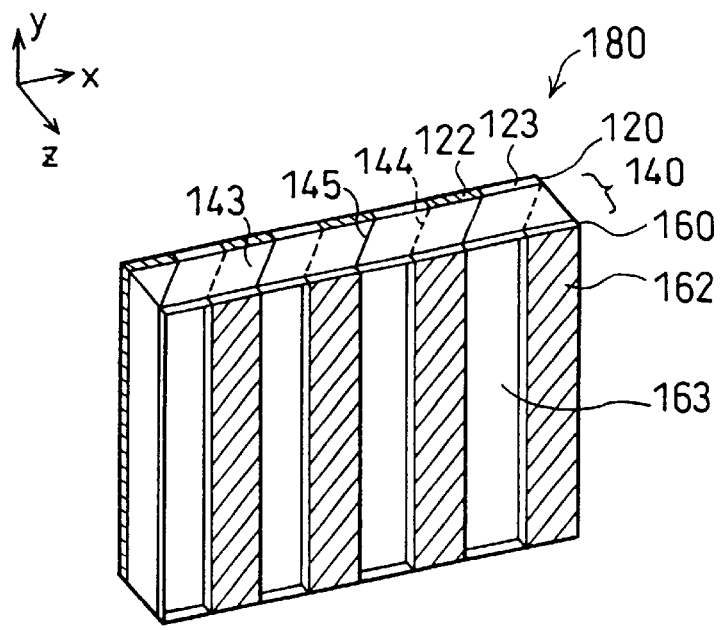
FIGS. 7(A) and 7(B) show a possible configuration of the polarized light generator 180.
Figure 7B:
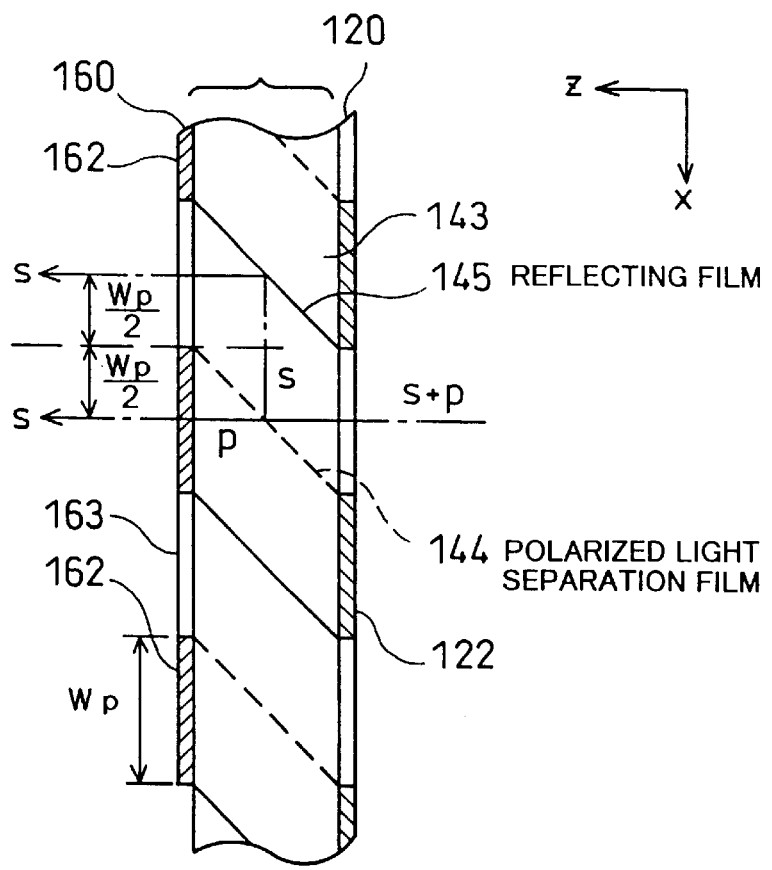

FIGS. 7(A) and 7(B) show a possible configuration of the polarized light generator 180. FIG. 7(A) is a perspective view of the polarized light generator 180. The polarized light generator 180 includes a shading plate 120, a polarization beam splitter array 140, and a selective retardation plate 160.

The polarization beam splitter array 140 includes a plurality of parallelepiped transparent plate members 143 that are successively bonded together. Polarized light separation film 144 and reflecting films 145 are alternately formed on the interfaces of the transparent plate members 143. The polarization beam splitter array 140 is manufactured by bonding a plurality of sheet glasses with the polarized light splitting films and the reflecting films formed thereon and cutting the sheet glass laminate obliquely at a specific angle, so that the polarized light splitting films 144 and the reflecting films 145 are arranged alternately. The polarized light separation film 144 is composed of a dielectric multi-layered film, whereas the reflecting film 145 is composed of a dielectric multi-layered film or an aluminum film.

As shown in FIGS. 7(A) and 7(B), the shading plate 120 includes a plurality of shading faces 122 and a plurality of aperture faces 123 that are arranged in stripe. The light flux entering the shading face 122 is blocked by the shading plate 120, whereas the light flux entering the aperture face 123 passes through the shading plate 120. The shading plate 120 accordingly has the function of regulating the transmission of light fluxes according to the positions on the shading plate 120. The arrangement of the shading faces 122 and the aperture faces 123 is set to cause the partial light fluxes emitted from the second lens array 40 to enter only the polarized light splitting films 144 in the polarization beam splitter array 140 and not to enter the reflecting films 145. Namely the arrangement causes the center of each aperture face 123 in the shading plate 120 to be substantially coincident with the center of a corresponding polarized light separation film 144 in the polarization beam splitter array 140. The lateral opening width (the opening width in the x-axis direction) of the aperture face 123 is set to be substantially identical with a width Wp of the polarized light separation film 144 in the x-axis direction. There are substantially no partial light fluxes that enter the reflecting films 145 not via the polarized light splitting films 144 but directly, since such partial light fluxes have been blocked in advance by the shading faces 122 of the shading plate 120. Substantially all the partial light fluxes that have passed through the aperture faces 123 of the shading plate 120 enter only the polarized light splitting films 144. Typical examples of the shading plate 120 include a transparent plate-like body (for example, a glass plate) partially coated with a light shielding film (such as a chromium film, an aluminum film or a dielectric multilayered film) and a light shielding material, such as an aluminum plate, with openings formed therein.

FIG. 7(B) shows the functions of the polarized light generator. The principal ray (the central optical path) of the light fluxes emitted from the second lens array 40 passes through the aperture face 123 of the shading plate 120 substantially in parallel to the system optical axis 200LC and is divided into an s-polarized light component and a p-polarized light component by the polarized light separation film 144. The p-polarized light component is transmitted through the polarized light separation film 144, whereas the s-polarized light component is reflected from the polarized light separation film 144 and further from the reflecting film 145 and is emitted substantially in parallel to the p-polarized light component, which has passed through the polarized light separation film 144. The selective retardation plate 160 has $\lambda/2$ retardation layers 162 that are formed on the emitting part of the light components transmitted through the polarized light splitting films 144. The selective retardation plate 160 also has opening layers 163 that are formed in positions without the $\lambda/2$ retardation layers, and more precisely, on the part emitting the light components reflected from the reflecting films 145. The p-polarized light component transmitted through the polarized light separation film 144 is converted into an s-polaized light component and output by the λ/2 retardation layer 162. The light fluxes that enter the polarized light generator 180 and have the random polarized directions are mostly converted into s-polarized light components to be output. One possible modification may form the λ/2 retardation layers 162 in the selective retardation plate 160 only on the part emitting the light components reflected from the reflecting films 145, in order to cause the light fluxes to be mostly converted into p-polarized light components to be output.

As clearly understood from FIG. 7(B), the center of the two s-polarized light components (the middle of the two s-polarized light components) emitted from the polarized light generator 180 is shifted in the x-axis direction from the center of the light fluxes of random polarizing directions that have entered the polarized light generator 180. The amount of shift is equal to half the width Wp of the λ/2 retardation layer 162 (that is, the width of the polarized light separation film 144 in the x-axis direction). Referring to FIG. 6, the optical axis 2OLC of the light source 20 is accordingly shifted from the system optical axis 200LC after the polarized light generator 180 by the distance Dp equal to Wp/2.

The functions of the illumination system 200 of the second embodiment may be summarized as follows. The first lens array 30, the second lens array 40, and the superimposing lens 50 constitute the optical integrator system. The plurality of partial light fluxes divided by the first lens array 30 are superimposed on the illumination area 80 by section of the superimposing lens 50. The condenser lens 60 and the diverging lens 70, on the other hand, constitute the afocal optical system that contracts the total width of the light flux entering the second lens array 40. The polarizing light generator 180 changes the partial light fluxes of random polarizing directions to one type of polarized light fluxes having a substantially identical polarizing direction. The shading plate 120 is disposed on the light-entering side of the polarization beam splitter array 140, in order to cause the partial light fluxes to enter only the polarized light splitting films 144. There are thus substantially no partial light fluxes that enter the polaized light splitting films 144 via the reflecting films 145. The type of the polarized light fluxes emitted from the polarized light generator 180 is thus practically limited to one. The illumination area 80 is accordingly irradiated with practically one type of polarized light fluxes in a substantially uniform manner. In the event that the light flux emitted from the light source 20 has a good parallelism, the second lens array 40 and the shading plate 120 may be omitted from the configuration.

As described above, like the illumination system 100 of the first embodiment, the illumination system 200 of the second embodiment can decrease the incident angle of the illumination light that irradiates the illumination area 80. The use of the optical elements that cause the rays of light to enter the illumination area 80 improves the efficiency of light without making the whole system undesirably bulky, compared with the prior art illumination system. The light flux emitted from the afocal optical system has the contracted total width as a whole, and the optical elements located after the afocal optical system can thus be reduced in size.

The illumination system 200 of the second embodiment further has the following effects, in addition to the above advantages. The polarized light generator 180 changes the light fluxes of random polarizing directions emitted from the light source 20 to one type of polarized light fluxes having a substantially identical poling direction, with which the illumination area 80 is irradiated in a substantially uniform manner. The loss of light hardly occurs in the process of generating the polarized light fluxes, so that almost all the light emitted from the light source is led to the illumination area 80. This results in the extremely high utilization efficiency of light. Since the shading plate 120 is included in the polarized light generator 180, the polarized light fluxes that irradiate the illumination area 80 are hardly mixed with other polarized light fluxes having a different polarizing direction. In the case where the polarized light illumination system of the present invention is used as the optical system that illuminates a modulation section, such as a liquid-crystal device, which uses the polarized light fluxes for a display, a polarizer conventionally located on the light-entering side of the modulation section may be omitted in some cases. Even in the event that a polarizer is required like the prior art structure, the quantity of light absorption in the polarizer is extremely small and thereby effectively prevents a temperature increase of the polarizer and the modulation section. A cooling system that is conventionally required to decrease the temperature of the polarizer can thus be reduced in size or simplified.

As clearly understood from the compaison between the first embodiment shown in FIG. 1 and the second embodiment shown in FIG. 6, the illumination system without the polarized light generator and the illumination system with the polarized light generator have similar configurations except the polarized light generator. This is also true in other embodiments discussed below.

In the second embodiment, the condenser lens 60 and the first lens array 30 may be optically integrated as shown in FIGS. 3(A-1) and 3(A-2). In a similar manner, the diverging lens 70 and the second lens array 40 may be optically integrated as shown in FIGS. 3(B-1) and 3(B-2). In accordance with a further modification, all the optical elements between the diverging lens 70 and the superimposing lens 50 may be optically integrated.

C. Third Embodiment

Figure 8:
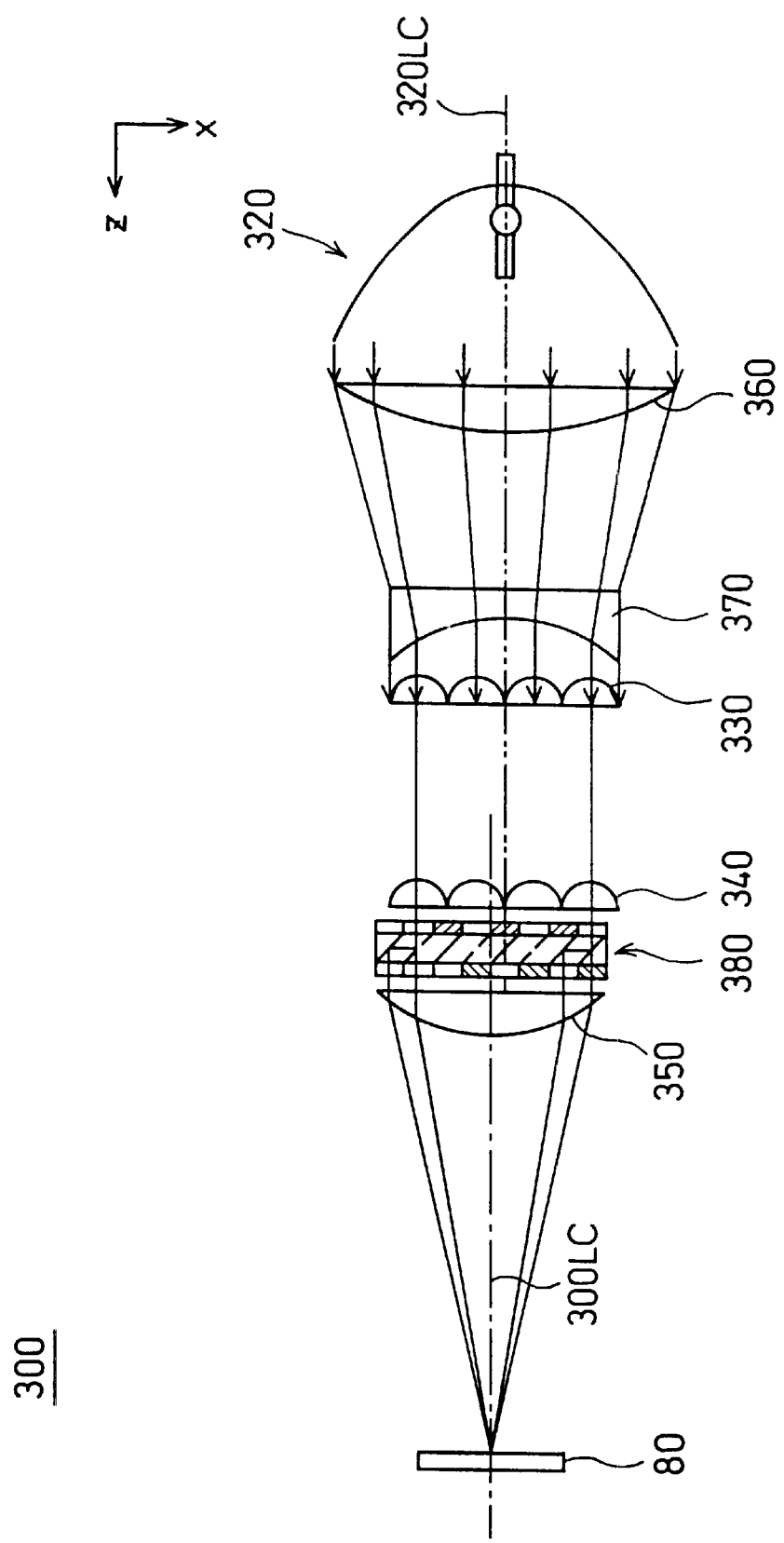
FIG. 8 is a plan view schematically illustrating a main part of another illumination system in a third embodiment according to the present invention.

FIG. 8 is a plan view schematically illustrating a main part of another illumination system in a third embodiment according to the present invention. This illumination system 300 includes a light source 320 that emits a substantially parallel light flux, a condenser lens 360, a diverging lens 370, a first lens array 330, a second lens array 340, a polarized light generator 380, and a superimposing lens 350. These constituents are arranged in this sequence along a system optical axis 300LC. The illumination system 300 is characterized by the arrangement that the condenser lens 360 and the diverging lens 370 constituting an afocal optical system are interposed between the light source 320 and the first lens array 330. The first lens array 330, the second lens array 340, the polarized light generator 380, and the superimposing lens 350 are arranged to have a width corresponding to the total width of the light flux contracted by the afocal optical system. The functions of these optical elements are identical with the first lens array 30, the second lens array 40, the polarized light generator 180, and the superimposing lens 50 discussed in the illumination systems 100 and 200 and are thus not specifically described here.

In the illumination system 300 of the third embodinent, the condenser lens 360 and the diverging lens 370 first contract the width of the substantially parallel light flux emitted from the light source 320. This arrangement reduces the size of the respective optical elements arranged after the afocal optical system (including the condenser lens 360 and the diverging lens 370), and decreases the incident angle of the illumination light that irradiates the illumination area 80.

The diverging lens 370 may be arranged immediately after the first lens array 370. In this third embodiment, the diverging lens 370 and the first lens array 330 may be optically integrated. In a similar manner, all the optical elements between the second lens array 340 and the superimposing lens 350 may be optically integrated.

D. Fourth Embodiment

Figure 9:
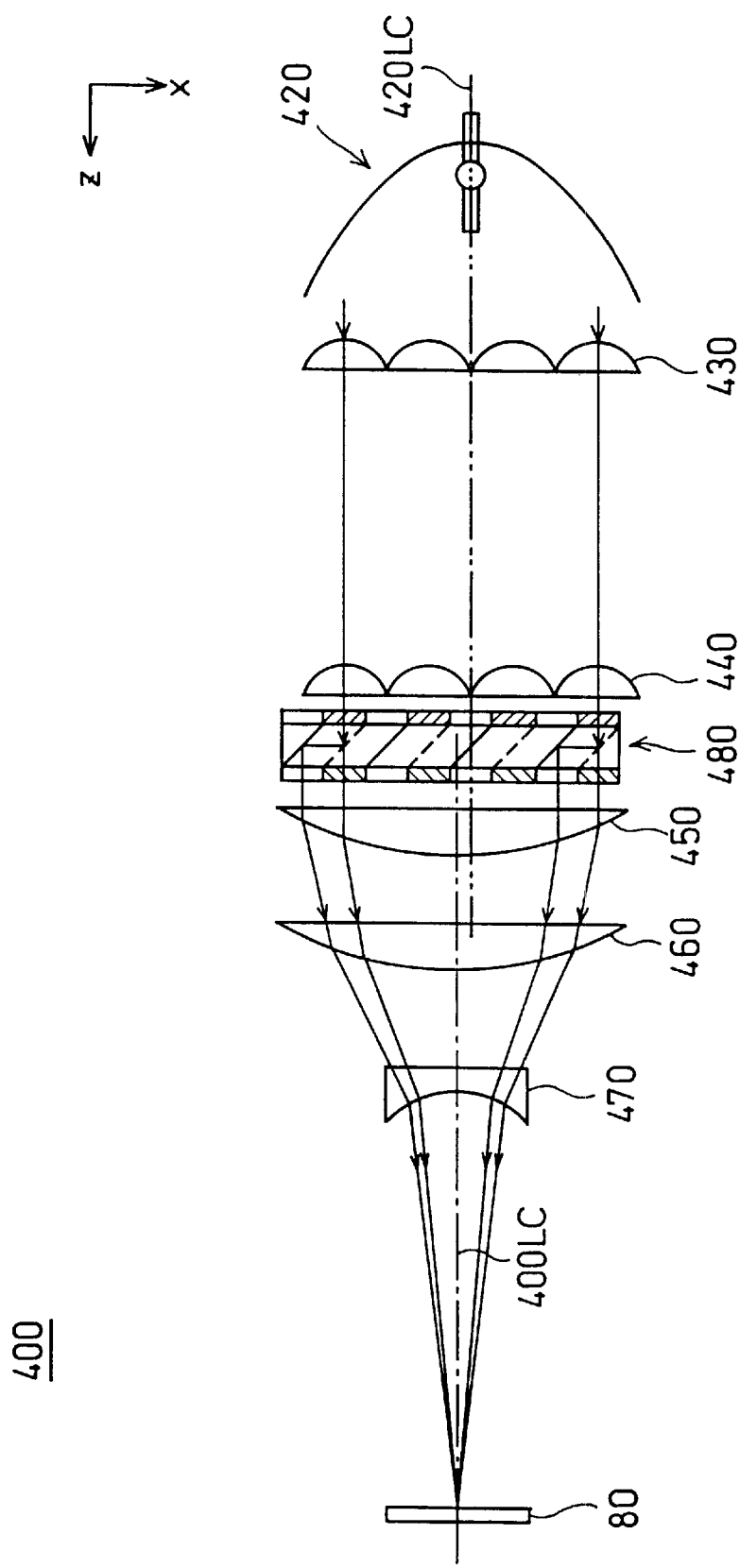
FIG. 9 is a plan view schematically illustrating a main part of still another illumination system in a fourth embodiment according to the present invention.

FIG. 9 is a plan view schematically illustrating a main part of still another illumination system in a fourth embodiment according to the present invention. This illumination system 400 includes a light source 420 that emits a substantially parallel light flux, a first lens array 430, a second lens array 440, a polarized light generator 480, a superimposing lens 450, a condenser lens 460, and a diverging lens 470. These constituents are arranged in this sequence along a system optical axis 400LC. The illumination system 400 is characterized by the arrangement that the condenser lens 460 and the diverging lens 470 constituting an afocal optical system are disposed after the superimposing lens 450, that is, between the superimposing lens 450 and the illumination area 80. The first lens array 430, the second lens array 440, the polarized light generator 480, and the superimposing lens 450 are arranged before the afocal optical system and have the size corresponding to that of the light source 420. The fuctions of these optical elements are identical with the first lens array 30, the second lens array 40, the polarized light generator 180, and the superimposing lens 50 discussed in the illumination systems 100 and 200 and are thus not specifically described here.

In the illumination system 400 of the fourth embodiment, the function of the afocal optical system including the condenser lens 460 and the diverging lens 470 contracts the total width of the plurality of partial light fluxes emitted from the superimposing lens 450. In the fourth embodiment, the plurality of partial light fluxes emitted from the afocal optical system are only superimposed to irradiate the illumination area 80. This arrangement enables the total width of the light flux as a whole to be contracted as much as possible by the afocal optical system. Compared with the other embodiments discussed above, the arrangement of the fourth embodiment can further decrease the incident angle of the illumination light.

Although the condenser lens 460 and the superimposing lens 450 are illustrated as separate optical elements for the purpose of clarifying the functions of the afocal optical system in the fourth embodiment, the condenser lens 460 and the superimposing lens 450 are optically integrated in general. Namely the condenser lens 470 and the superimposing lens 450 may be constructed as one condenser lens. Alternatively all the optical elements between the second lens array 440 and the condenser lens 460 may be integrated optically.

E. Fifth Embodiment

Figure 10:
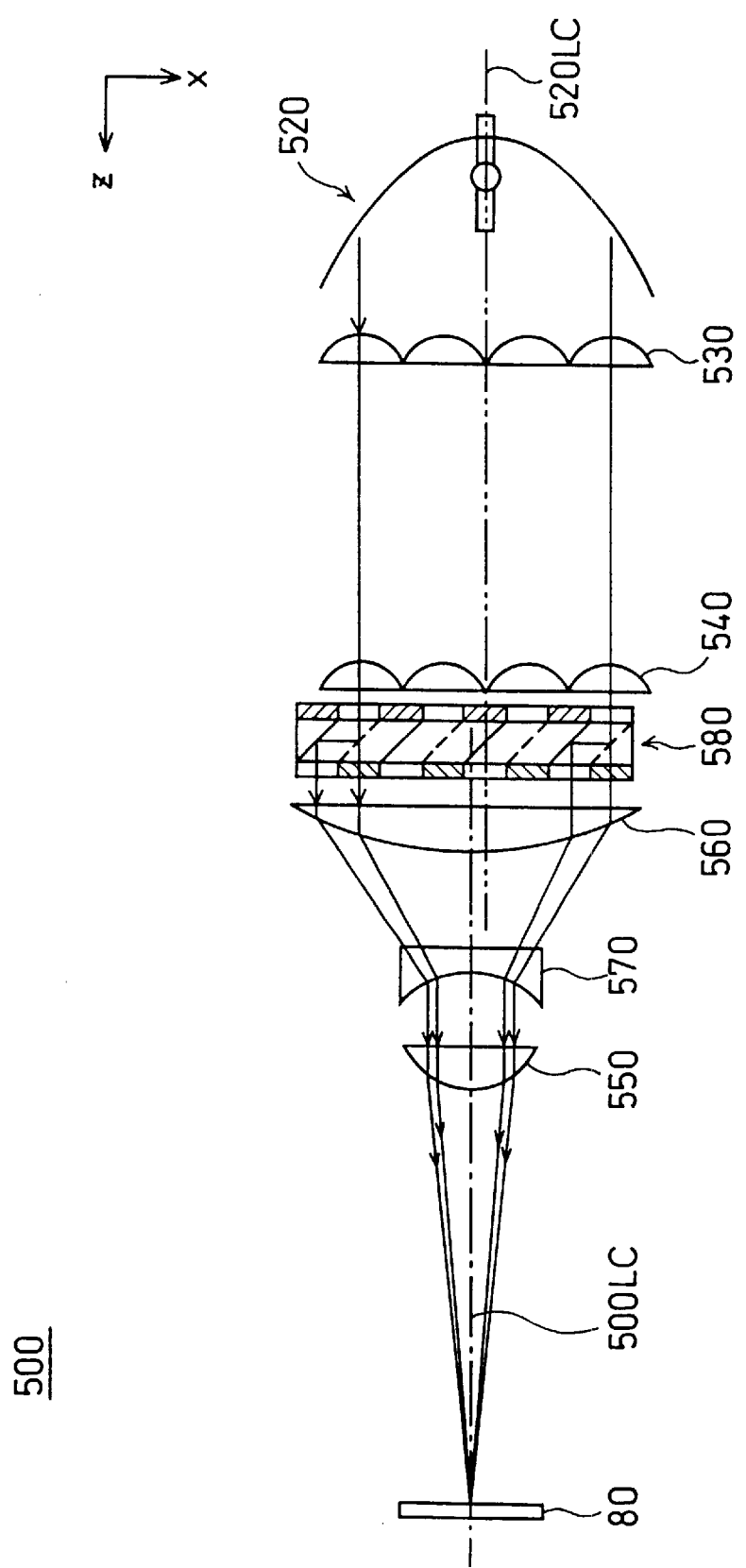
FIG. 10 is a plan view schematically illustrating a main part of another illumination system in a fifth embodiment according to the present invention.

FIG. 10 is a plan view schematically illustrating a main part of another illumination system in a fifth embodiment according to the present invention. This illumination system 500 includes a light source 520 that emits a substantially parallel light flux, a first lens array 530, a second lens array 540, a polarized light generator 580, a condenser lens 560, a diverging lens 570, and a superimposing lens 550. These constituents are arranged in this sequence along a system optical axis 500LC. The illumination system 500 is characterized by the arrangement that the condenser lens 560 and the diverging lens 570 constituting an afocal optical system are disposed before the superimposing lens 550, that is, between the polarized light generator 580 and the superimposing lens 550. The first lens array 530, the second lens array 540, and the polarized light generator 580 are arranged before the afocal optical system and have the size corresponding to that of the light source 520. The functions of these optical elements are identical with the first lens array 30, the second lens array 40, and the polarized light generator 180 discussed in the illumination systems 100 and 200 and are thus not specifically described here.

In the illumination system 500 of the fifth embodiment, the function of the afocal optical system including the condenser lens 560 and the diverging lens 570 contracts the total width of the plurality of partial light fluxes emitted from the polarized light generator 580. The principal ray of the plurality of partial light fluxes emitted from the diverging lens 570 enters the superimposing lens 550 substantially in parallel to the system optical axis 500LC and is superimposed on the illumination area 80. Like in the illumination system 400 of the fourth embodiment, in the fifth embodiment, the plurality of partial light fluxes emitted from the afocal optical system are only superimposed to irradiate the illumination area 80. This arrangement enables the total width of the light flux as a whole to be contracted as much as possible by the afocal optical system. This ensures the size reduction of the superimposing lens 550. Compared with the first through the third embodiments discussed above, the arrangement of the fifth embodiment can further decrease the incident angle of the illumination light.

The superimposing lens 550 and the diverging lens 570 in the fifth embodiment may be optically integrated. In a similar manner, all the optical elements between the second lens array 540 and the condenser lens 560 may be integrated optically.

F. Sixth Embodiment

Figure 11:
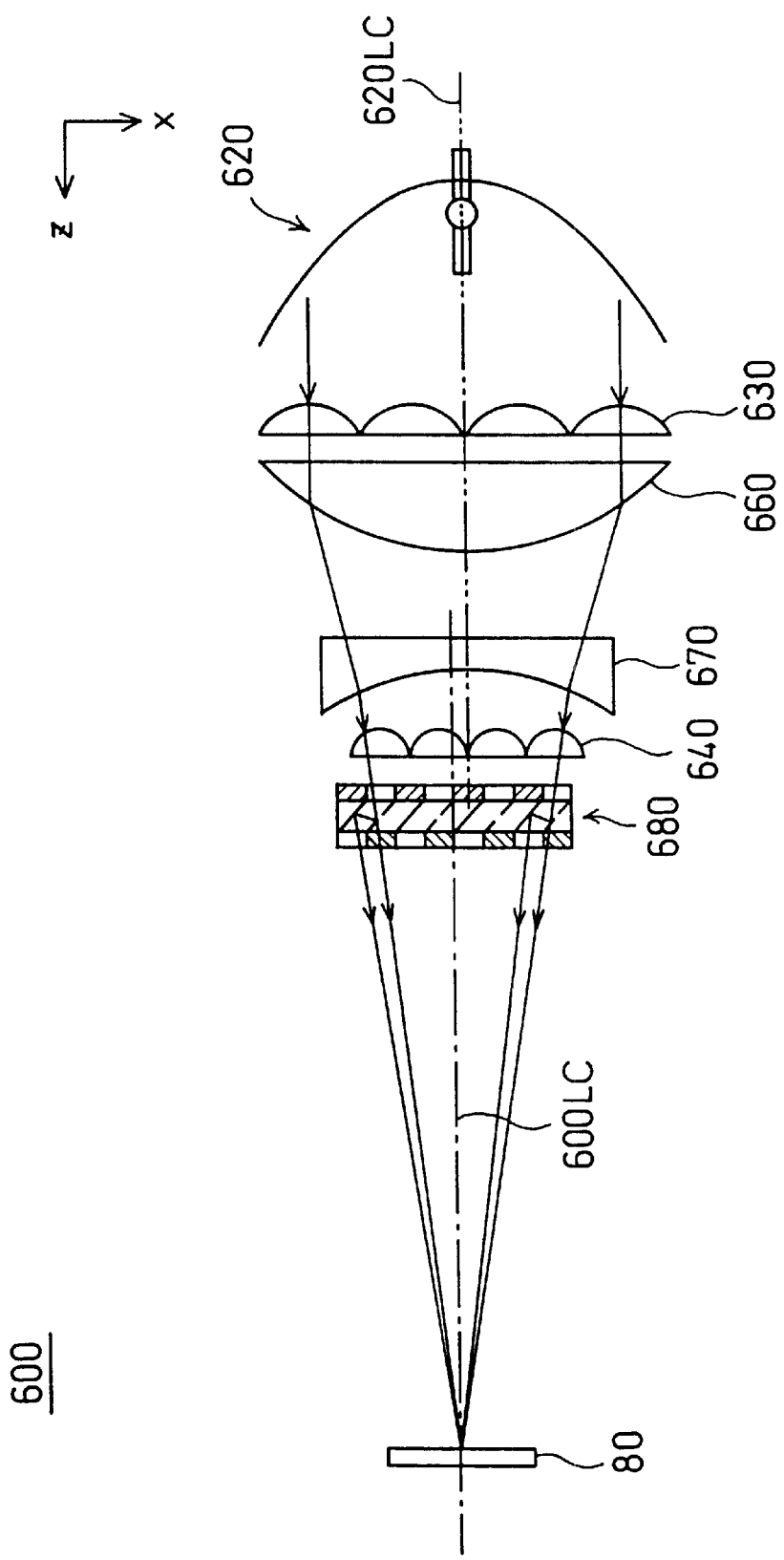
FIG. 11 is a plan view schematically illustrating a main part of still another illumination system in a sixth embodiment according to the present invention.

FIG. 11 is a plan view schematically illustrating a main part of still another illumination system in a sixth embodiment according to the present invention. This illumination system 600 includes a light source 620 that emits a substantialy parallel light flux, a first lens array 630, a condenser lens 660, a diverging lens 670, a second lens array 640, and a polarized light generator 680. These constituents are arranged in this sequence along a system optical axis 600LC. The illumination system 600 is characterized by the arrangement that the condenser lens 660 and the diverging lens 670 constituting an afocal optical system are interposed between the first lens array 630 and the second lens array 640 and that the superimposing lens is omitted. The respective optical elements arranged after the afocal optical system are designed to have the size corresponding to the width of the light flux contracted by the afocal optical system. The functions of the first lens array 630, the second lens array 640, and the polarized light generator 680 are identical with the first lens array 30, the second lens array 40, and the polarized light generator 180 discussed in the illumination systems 100 and 200 and are thus not specifically described here.

The condenser lens 660 and the diverging lens 670 have the function of the afocal optical system. The condenser lens 660 causes the plurality of partial light fluxes divided by the first lens array 630 to be superimposed on the illumination area 80. The function of the afocal optical system including the condenser lens 660 and the diverging lens 670 contracts the total width of the plurality of partial light fluxes emitted from the first lens array 630. The superimposing function of the condenser lens 660 causes the plurality of partial light fluxes emitted from the diverging lens 670 to be superimposed on the illumination area 80 via the second lens array 640 and the polarized light generator 680. Like the illumination systems of the other embodiments discussed above, the arrangement of the sixth embodiment decreases the incident angle of the illumination light that irradiates the illumination area 80. Since the total width of the light flux emitted from the afocal optical system is contracted, the optical elements arranged after the afocal optical system can be reduced in size.

As discussed previously in the illumination system 200, the use of the polarized light generator 680 changes the light fluxes of random polarizing directions to one type of polarized light fluxes having a substantially identical polarizing direction, with which the illumination area 80 is irradiated in a substantially uniform manner. The principal ray of each partial light flux is inclined to the system optical axis 600LC, so that the respective partial light fluxes entering the polarized light generator 680 are superimposed on the illumination area 80. It is, however, preferable that the incident light flux entering the polarized light generator 680 is in parallel to the optical axis for the higher generation efficiency of the polarized light fluxes. While the omission of the superimposing lens is the advantage of the sixth embodiment, the loss of light arises in the process of generating the polarized light fluxes and may result in the lower utilization efficiency of light, compared with the other embodiments discussed above.

In the sixth embodiment, the condenser lens 660 and the first lens array 630 may be integrated optically. In a similar manner, the diverging lens 670 and the second lens array 640 may be integrated optically. Alternatively all the optical elements between the diverging lens 670 and the polarized light generator 680 may be integrated optically.

F. Seventh Embodiment

Figure 12:
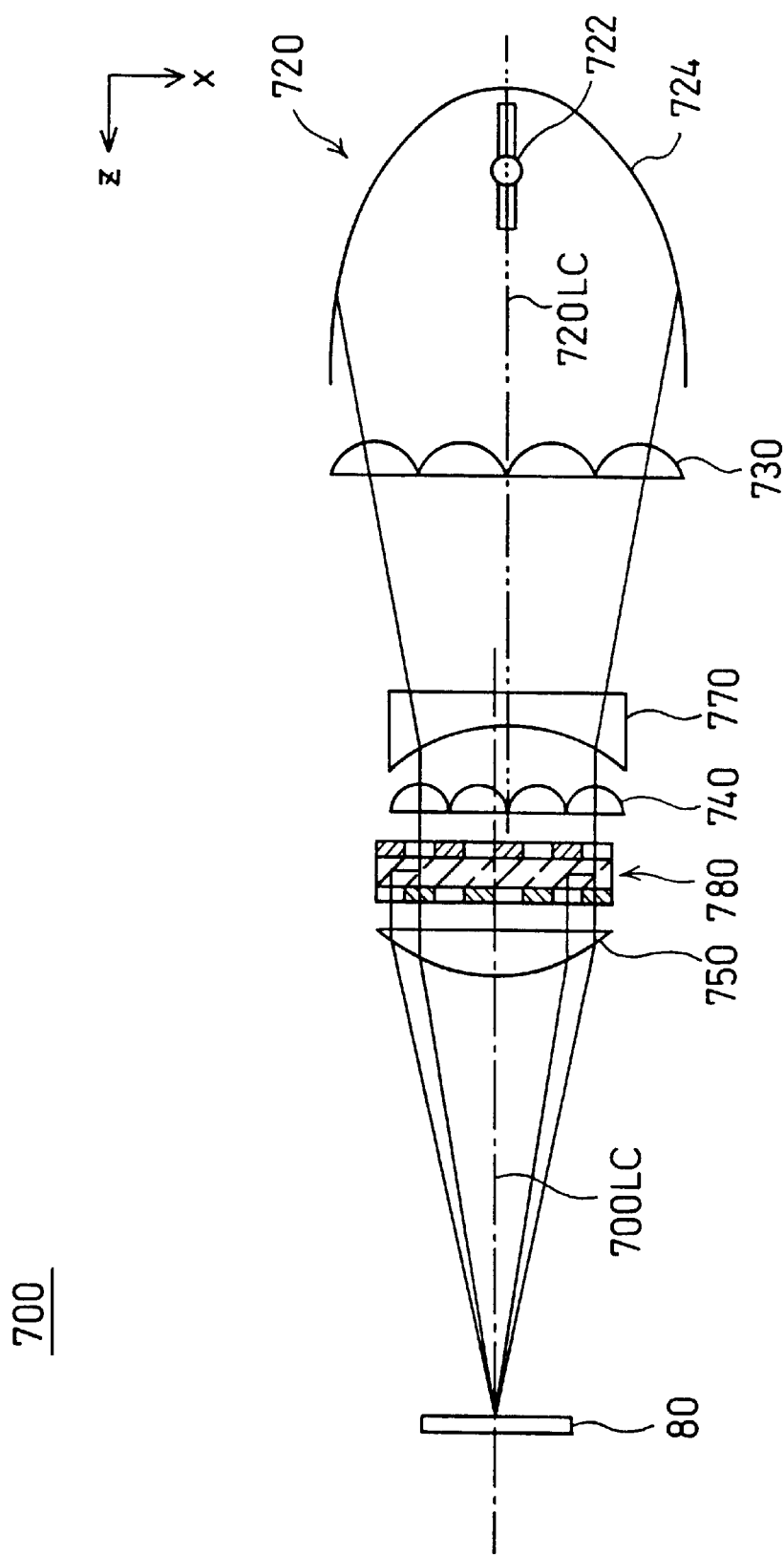
FIG. 12 is a plan view schematically illustrating a main part of another illumination system in a seventh embodiment according to the present invention.

FIG. 12 is a plan view schematically illustrating a main part of another illumination system in a seventh embodiment according to the present invention. This illumination system 700 includes a light source 720, a first lens array 730, a diverging lens 770, a second lens array 740, a polarized light generator 780, and a superimposing lens 750. These constituents are arranged in this sequence along a system optical axis 700LC.

The light source 720 indudes a light source lamp 722, which functions as a radiant light source for emitting radiant rays, and a concave mirror 724, which reflects the radiant rays emitted from the light source lamp 722 and condenses the reflected rays of light at a predetermined position on a light source optical axis 720LC. A ellipsoidal mirror is preferably used for the concave mirror 724.

The illumination system 700 is characterized by the arrangement that the concave mirror 724 of the light source 720 and the diverging lens 770 constitute an afocal optical system. The second lens array 740, the polarized light generator 780, and the superimposing lens 750 are designed to have the size corresponding to the width of the light flux contracted by the afocal optical system. The functions of the first lens array 730, the second lens array 740, the polarized light generator 780, and the superimposing lens 750 are identical with the first lens array 30, the second lens array 40, the polarized light generator 180, and the superimposing lens 50 discussed in the illumination systems 100 and 200 and are thus not specifically described here.

In the illumination system 700 of the seventh embodiment, the light flux emitted from the light source 720 is condensed and passes through the first lens array 730 to be divided into a plurality of partial light fluxes. The diverging lens 770 converts the principal rays of the plurality of partial light fluxes into the light fluxes substantially parallel to the system optical axis 700LC. The plurality of partial light fluxes accordingly have the contracted total width as a whole, enter the second lens array 740, and irradiate the illumination area 80 via the polarized light generator 780 and the superimposing lens 750. This arrangement ensures the size reduction of the respective optical elements arranged after the diverging lens 770, and decreases the incident angle of the illumination light that irradiates the illumination area 80.

In the seventh embodiment, the diverging lens 770 and the second lens array 740 may be integrated optically. Alternatively all the optical elements between the diverging lens 770 and the superimposing lens 750 may be integrated optically.

G. Eighth Embodiment

Figure 13:
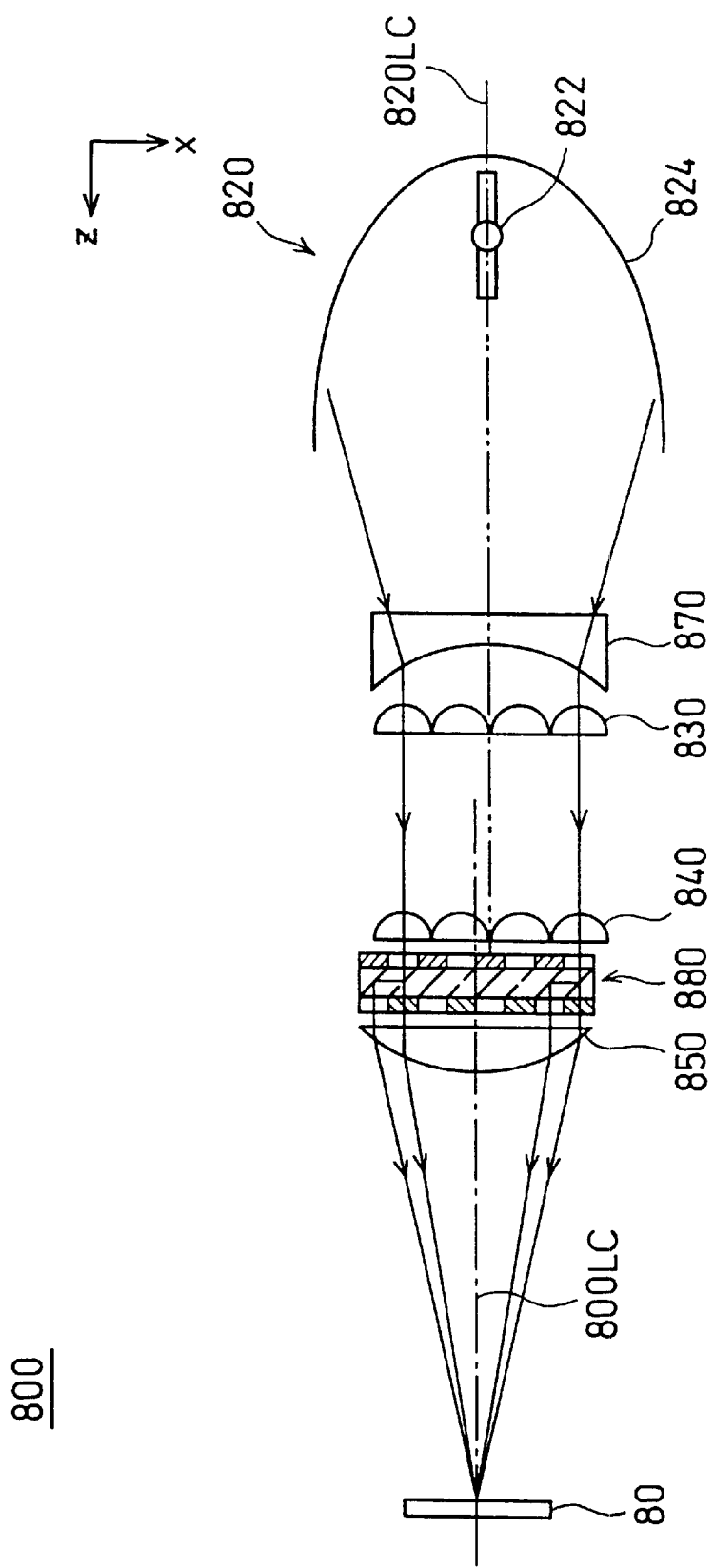
FIG. 13 is a plan view schematically illustrating a main part of another illumination system in an eighth embodiment according to the present invention.

FIG. 13 is a plan view schematically illustrating a main part of another illumination system in an eighth embodiment according to the present invention. This illumination system 800 includes a light source 820, a diverging lens 870, a first lens array 830, a second lens array 840, a polarized light generator 880, and a superimposing lens 850. These constituents are arranged in this sequence along a system optical axis 800LC.

Like the light source 720 (see FIG. 12), the light source 820 includes a light source lamp 822, which function as a radiant light source for emitting radiant rays, and a concave mirror 824, which reflects the radiant rays emitted from the light source lamp 822 and condenses the reflected rays of light at a predetermined position on a light source optical axis 820LC.

Like the illumination system 700 (see FIG. 12), the illumination system 800 is characterized by the arrangement that the concave mirror 824 of the light source 820 and the diverging lens 870 constitute an afocal optical system. The first lens array 830, the second lens array 840, the polarized light generator 880, and the superimposing lens 850 are designed to have the size corresponding to the width of the light flux contracted by the afocal optical system. The functions of these optical elements are identical with the first lens array 30, the second lens array 40, the polarized light generator 180, and the superimposing lens 50 discussed in the illumination systems 100 and 200 and are thus not specifically described here.

In the illumination system 800 of the eighth embodiment, the condensed light flux emitted from the light source 820 passes through the diverging lens 870 to be converted into a substantially parallel light flux having a contracted width. The substantially parallel light flux then enters the first lens array 830 and irradiates the illumination area 80 via the second lens array 840, the polarized light generator 880, and the superimposing lens 850. This arrangement ensures the size reduction of the respective optical elements arranged after the diverging lens 870, and decreases the incident angle of the illumination light that irradiates the illumination area 80.

In the eighth embodiment, the diverging lens 870 and the first lens array 830 may be integrated optically. In a similar manner, all the optical elements between the second lens array 840 and the superimposing lens 850 may be integrated optically.

H. Ninth Embodiment

Figure 14:
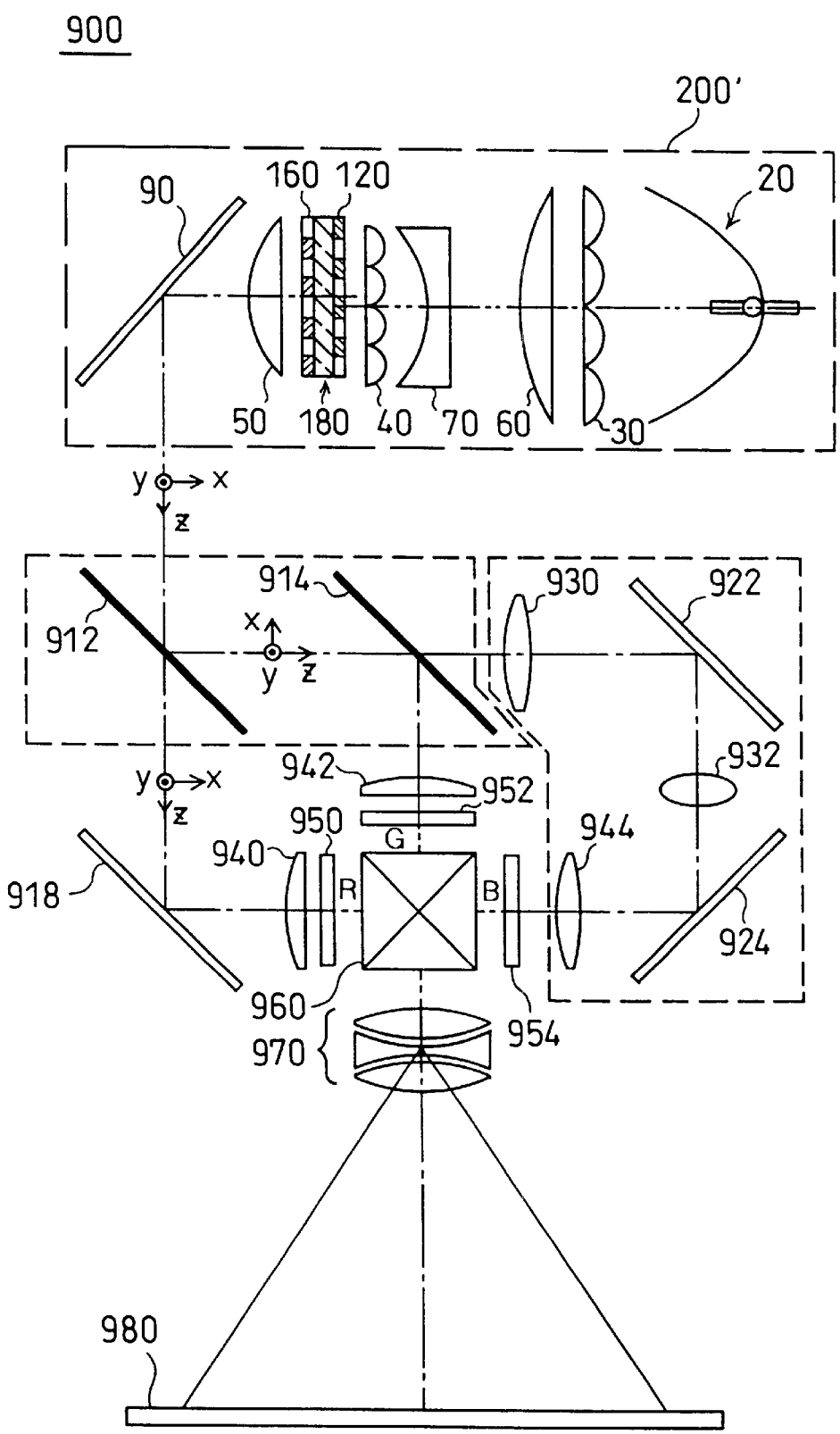
FIG. 14 is a plan view schematically illustrating a main part of a projection display apparatus using an illumination system of the present invention.
Figure 15A:
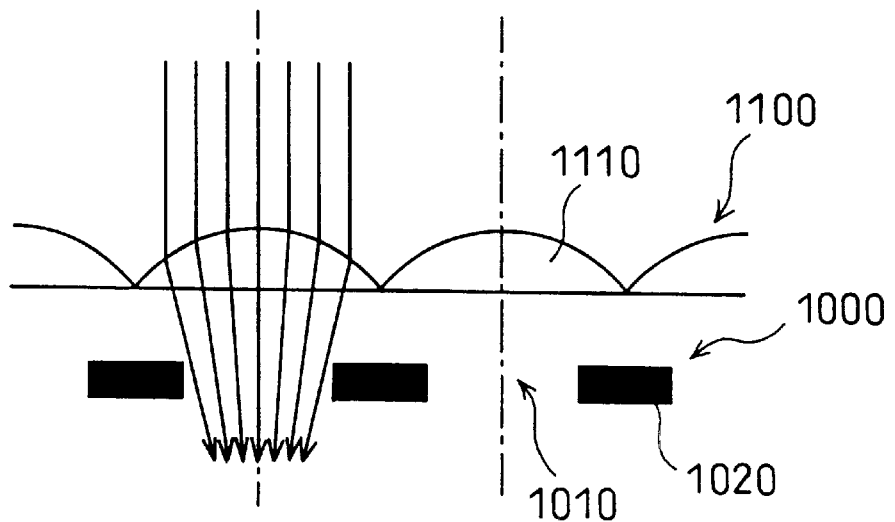
FIGS. 15(A) and 15(B) shows light fluxes entering a liquid-cystal panel in the case where micro lenses are disposed on the light-entering side of the liquid-crystal panel.
Figure 15B:
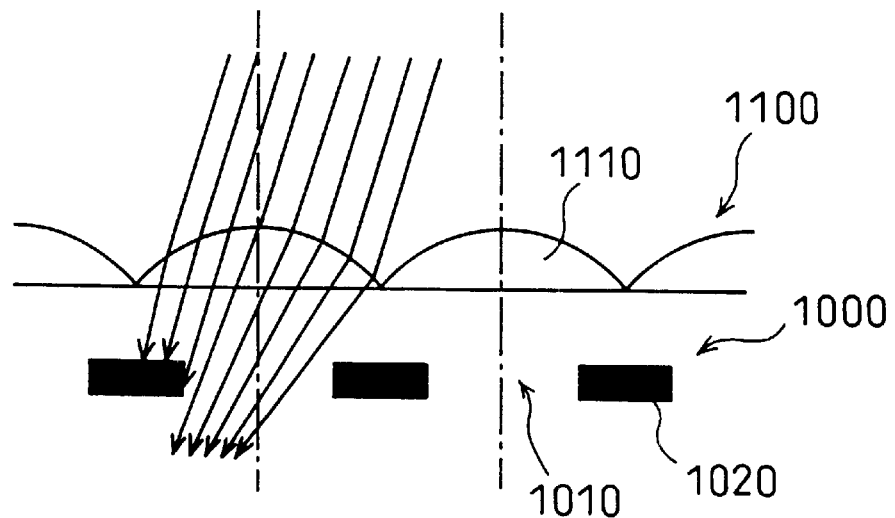

FIG. 14 is a plan view schematically illustrating a main part of a projection display apparatus using an illumination system of the present invention. This projection display apparatus 900 includes an illumination system 200' that basically has the same structure as that of the illumination system 200 of the second embodiment. The difference from the illumination system 200 is that a reflecting mirror 90 is disposed on the light-emitting side of the superimposing lens 50, in order to lead the light flux emitted from the superimposing lens 50 to a dichroic mirror 912 discussed below.

The projection display apparatus 900 includes the illumination system 200', dichroic mirrors 912 and 914, reflecting mirrors 918, 922, and 924, an entrance lens 930, a relay lens 932, three field lenses 940, 942, and 944, three liquidstal light valves (liquid-crystal panels) 950, 952, and 954, a cross dichroic prism 960, and a projection lens system 970.

The illumination system 200' emits linearly polarized light fluxes having a substantially identical polarizing direction (s-polarized light fluxes in the above embodiment) and illuminates the liquid-crystal light valves 950, 952, and 954 as the illumination area 80 with the linearly polarized light fluxes. Polarizers are generally disposed on the respective light-entering sides of the liquid-crystal light valves 950, 952, and 954. The polarizing direction of the linearly polarized light fluxes emitted from the illumination system 200' should thus be set to enable these polarizers to transmit the linearly polarized light fluxes. This arrangement ensures the high utilization efficiency of the illumination light emitted from the illumination system 200'.

The two dichroic mirrors 912 and 914 have the function of the color separator that divides the illumination light (white light) emitted from the illumination system into three color light components of red, green, and blue. The first dichroic mirror 912 transmits a red light component included in the white light flux emitted from the illumination system 200', while reflects a blue light component and a green light component of the white light flux. The red light component transmitted through the first dichroic mirror 912 is reflected by the reflecting mirror 918 and passes through the field lens 940 to reach the liquid-crystal light valve 950 for red light. The field lens 940 converts each partial light flux emitted from the superimposing lens 50 into a light flux substantially in parallel to the principal ray of the partial light flux. The field lenses 942 and 944 disposed before the other liquid-crystal light valves have similar functions. The blue light component and the green light component are reflected by the first dichroic mirror 912 as mentioned above. The green light component is then reflected by the second dichroic mirror 914 and passes through the field lens 942 to reach the liquid-crystal light valve 952 for green light. The blue light component is, on the other hand, transmitted through the second dichroic mirror 914 and passes through the relay lens system, which includes the entrance lens 930, the relay lens 932, and the reflecting mirrors 922 and 924, and subsequently through the field lens (exit lens) 944 to reach the liquid-crystal light valve 954 for blue light. The relay lens system is used for blue light, in order to prevent a possible decrease in utilization efficiency of light, which is ascribed to the fact that the blue light component has a longer optical path than those of the other color light components. This arrangement enables substantially all the partial light fluxes entering the entrance lens 930 to be transmitted to the exit lens 944.

The three liquid-crystal light valves 950, 952, and 954 attain the functions of light modulators that respectively modulate the three color light components according to given image information (image signals) and create a resulting image. Micro lenses (not shown) are arranged corresponding to the respective pixels of the liquid-crystal panels on the respective light-entering sides of the liquid-crystal light valves 950, 952, and 954. The cross dichroic prism 960 has the function of a color combiner that combines the three color light components together to produce a color image. The cross dichroic prism 960 has a dielectric multi-layered film for reflecting red light and another dielectric multi-layered film for reflecting blue light, which are formed in a substantially X shape on the interfaces of four right-angle prisms. The functions of these dielectric multi-layered films combine the three color light components together to a composite light beam for projecting a color image. The composite light beam generated by the cross dichroic prism 960 is emitted in the direction of the projection lens system 970. The projection lens system 970 has the function of the projection optical system that expands and projects the composite light beam, which is generated by the cross dichroic prism 960, on a projection screen 980 to display a color image.

This projection display apparatus 900 uses the illumination system 200' to decrease the incident angle of the light fluxes entering the micro lenses arranged on the respective light-entering sides of the liquidcrystal light valves 950, 952, and 954 as discussed in the second embodiment. This arrangement enables the light fluxes entering the micro lenses to be condensed with a high efficiency and effectively utilized in the liquid-crystal light valves 950, 952, and 954. The illumination system 200' also decreases the incident angle of the principal rays of the light fluxes entering the respective lenses arranged after the illumination system 200', for example, the field enses 940, 942, and 944, the entrance lens 930, the relay lens 932, and the projection ens system 970. This improves the utilization efficiency of light in these lenses. This configuration ensures a brighter, uniform, and even projected image.

Substantially one type of polarized light fluxes having an identical polariing direction, for example, s-polarized light fluxes, are emitted from the illumination system 200'. The substantially one type of polarized light fluxes having an identical polarizing direction are led to the three liquid-crystal light valves 950, 952, and 954. Since there is extremely little light absorption by the polarizers attached to these liquid-crystal light valves, the utilization efficiency of light is improved to give a brighter projected image. The extremely small quantity of heat generated by the light absorption alleviates the temperature increases of the polarizers and the liquid-crystal panels.

Any of the illumination systems in the other embodiments discussed previously may be used for the illumination system of the projection display apparatus 900 to exert the similar effects.

The present invention is not restricted to the above embodiments or their modifications, but there may be many other modifications, changes, and alterations without departing from the scope or spirit of the main characteristics of the present invention. Some examples of possible modification are given below.

(1) In the illumination systems of the embodiments discussed above, the afocal optical system consisting of the two optical elements, that is, the condenser lens and the diverging lens, is collectively disposed, for example, between the light source and the first lens array or between the first lens array and the second lens array. The configuration is, however, not restricted to these embodiments. The respective constituents of the afocal optical system may be separately disposed at appropriate positions in the illumination system. The only requirement for the configuration is to ecrease the incident angle of the light fluxes, which are emitted from the illumination system, into the illumination area.

(2) The ninth embodiment regards an example in which the illumination system of the present invention is applied to the transmissive projection display apparatus. The principle of the present invention is also applicable to reflective projection display apparatuses. Here the 'term transmissive' section that the light modulators, such as the liquid-crystal light valves, transmit light, and the term 'reflective' section that the light modulators reflect light. In the reflective projection display apparatus, the cross dichroic prism is utilized not only as the color separator that separates the white light into three color light components of red, green, and blue but as the color combiner that recombines the modulated three color light components and emits a composite light beam in a specific direction. Application of the present invention to the reflective projection display apparatus exerts the substantially similar effects to those in the transmissive projection display apparatus.

(3) The ninth embodiment regards the projection display apparatus for displaying color images. The principle of the present invention is also applicable to projection display apparatuses for displaying monochromatic images. Such application exerts the similar effects to those discussed in the projection display apparatus of the eighth embodiment.

The illumination system of the present invention is applicable to a variety of projection display apparatuses. The projection display apparatus of the present invention is applied to project and display images, for example, images output from the computer and images output from the video recorder, on the screen.

What is claimed is:

1. An illumination system, comprising:
    a light source configured to emit a substantially parallel light flux;
    a first lens array including a plurality of lenses configured to divide the substantially parallel light flux into a plurality of partial light fluxes;
    a second lens array including a plurality of lenses corresponding to the plurality of lenses included in the first lens array;
    a superimposing lens configured to cause the plurality of light fluxes emitted from the second lens array to be substantially superimposed on an illumination area; and
    a light flux contraction section disposed on an optical path between one of 1) the first and second lens arrays, 2) the light source and the first lens array, and 3) the second lens array and the superimposing lens, said light flux contraction section being configured to constitute an afocal optical system to change an incident light flux to an emitting light flux having a width narrower than a width of the incident light flux.

2. The illumination system according to claim 1, wherein the light flux contraction section includes a condenser lens and a diverging lens.

3. The illumination system according to claim 2, wherein the condenser lens is arranged separately from the first lens array.

4. The illumination system according to claim 2, wherein the condenser lens is optically integrated with the first lens array.

5. The illumination system according to claim 2, wherein the condenser lens and the first lens array comprises a decentered lens array.

6. The illumination system according to claim 2, wherein the diverging lens is arranged separately from the second lens array.

7. The illumination system according to claim 2, wherein the diverging lens is optically integrated with the second lens array.

8. The illumination system according to claim 2, wherein the diverging lens and the second lens array comprise a decentered lens array.

9. The illumination system according to claim 2, wherein the condenser lens is disposed between the light source and the first lens array, and the diverging lens and second lens array comprise a decentered lens array disposed between the first lens array and the superimposing lens.

10. The illumination system according to claim 1, wherein the light flux contraction section includes a first convex lens having a first focal length and a second convex lens having a second focal length shorter than the first focal length.

11. The illumination system according to claim 1, further comprising:
    a polarized light generator disposed at a specific position in the illumination system to convert light fluxes having random polarizing directions into one type of polarized light fluxes having a substantially identical polarizing direction and to emit the one type of polarized light fluxes.

12. The illumination system according to claim 11, wherein the polarized light generator comprises:
    a polarized light splitter configured to separate an incident light flux into two different types of polarized light fluxes having different polarizing directions; and
    a polarized light converter configured to convert the polarizing light direction of one type of polarized light flux identical with the polarizing direction of the other type of polarized light flux obtained by the polarized light splitter.

13. A projector that projects and displays an image, comprising:
    an illumination system that divides a light flux emitted from a light source into a plurality of partial light fluxes and causes the plurality of partial light fluxes to be substantially superimposed on an illumination area;
    a light modulator that has a light-entering face as the illumination area and modulates an incident light beam from the illumination system according to image information; and
    a projection optical system that projects a modulated light flux obtained by the light modulator on a projection surface, the illumination system comprising:
        a light source configured to emit a substantially parallel light flux;
        a first lens array including a plurality of lenses configured to divide the substantially parallel light flux into a plurality of partial light fluxes;
        a second lens array including a plurality of lenses corresponding to the plurality of lenses included in the first lens array;
        a superimposing lens configured to cause the plurality of light fluxes emitted from the second lens array to be substantially superimposed on an illumination area; and a light flux contraction section disposed on an optical path between one of 1) the first and second lens arrays, 2) the light source and the first lens array, and 3) the second lens array and the superimposing lens, said light flux contraction section being configured to constitute an afocal optical system to change an incident light flux to an emitting light flux having a width narrower than a width of the incident light flux.

14. The projector according to claim 13, wherein the light flux contraction section includes a condenser lens and a diverging lens.

15. The projector according to claim 14, wherein the condenser lens is arranged separately from the first lens array.

16. The projector according to claim 14, wherein the condenser lens is optically integrated with the first lens array.

17. The projector according to claim 14, wherein the condenser lens and the first lens array comprises a decentered lens array.

18. The projector according to claim 14, wherein the diverging lens is arranged separately from the second lens array.

19. The projector according to claim 14, wherein the diverging lens is optically integrated with the second lens array.

20. The projector according to claim 14, wherein the diverging lens and the second lens array comprises a decentered lens array.

21. The projector according to claim 14, wherein the condenser lens is disposed between the light source and the first lens array, and the diverging lens and second lens array comprise a decentered lens array disposed between the first lens array and the superimposing lens.

22. The projector according to claim 13, wherein the light flux contraction section includes a first convex lens having a first focal length and a second convex lens having a second focal length shorter than the first focal length.

23. The projector according to claim 13, further comprising:
  a polarized light generator disposed at a specific position in the illumination system to convert light fluxes having random polarizing directions into one type of polarized light fluxes having a substantially identical polarizing direction and to emit the one type of polarized light fluxes.

24. The projector according to claim 23, wherein the polarized light generator comprises:
  a polarized light splitter configured to separate an incident light flux into two different types of polarized light fluxes having different polarizing directions; and
  a polarized light converter configured to convert the polarizing light direction of one type of polarized light flux identical with the polarizing direction of the other type of polarized light flux obtained by the polarized light converter.

25. The projector according to claim 24, further comprising:
  a color separator configured to divide the light flux emitted from the illumination system into at least two color light fluxes;
  a plurality of the light modulators configured to respectively modulate the color light fluxes separated by the color separator; and
  a color combiner configured to combine the modulated color light fluxes together after the modulation in the plurality of light modulators,
wherein a composite light flux obtained by the color combiner is projected via the projection optical system.

26. An illumination system, comprising:
  a light source configured to emit a light flux;
  a first lens array including a plurality of lenses configured to divide the light flux from the light source into a plurality of partial light fluxes;
  a second lens array including a plurality of lenses corresponding to the plurality of lenses included in the first lens array;
  a superimposing lens configured to cause the plurality of light fluxes emitted from the second lens array to be substantially superimposed on an illumination area; and
  a light flux contraction section disposed on an optical path between the light source and the illumination area, said light flux contraction section being configured to constitute an afocal optical system to change an incident light flux to an emitting light flux having a width narrower than a width of the incident light flux.

27. The illumination system according to claim 26, wherein the light flux contraction section includes a condenser lens and a diverging lens.

28. The illumination system according to claim 27, wherein the condenser lens is arranged separately from the first lens array.

29. The illumination system according to claim 27, wherein the condenser lens is optically integrated with the first lens array.

30. The illumination system according to claim 27, wherein the condenser lens and the first lens array comprises a decentered lens array.

31. The illumination system according to claim 27, wherein the diverging lens is arranged separately from the second lens array.

32. The illumination system according to claim 27, wherein the diverging lens is optically integrated with the second lens array.

33. The illumination system according to claim 27, wherein the diverging lens and the second lens array comprise a decentered lens array.

34. The illumination system according to claim 27, wherein the condenser lens is disposed between the light source and the first lens array, and the diverging lens and second lens array comprise a decentered lens array disposed between the first lens array and the superimposing lens.

35. The illumination system according to claim 26, wherein the light flux contraction section includes a first convex lens having a first focal length and a second convex lens having a second focal length shorter than the first focal length.

36. The illumination system according to claim 27, further comprising:
  a polarized light generator disposed at a specific position in the illumination system to convert light fluxes having random polarizing directions into one type of polarized light fluxes having a substantially identical polarizing direction and to emit the one type of polarized light fluxes.

37. The illumination system according to claim 36, wherein the polarized light generator comprises:
  a polarized light splitter configured to separate an incident light flux into two different types of polarized light fluxes having different polarizing directions; and
  a polarized light converter configured to convert the polarizing light direction of one type of polarized light flux identical with the polarizing direction of the other type of polarized light flux obtained by the polarized light splitter.

38. A projector that projects and displays an image, comprising:
   an illumination system that divides a light flux emitted from a light source into a plurality of partial light fluxes and causes the plurality of partial light fluxes to be substantially superimposed on an illumination area;
   a light modulator that has a light-entering face as the illumination area and modulates an incident light beam from the illumination system according to image information; and
   a projection optical system that projects a modulated light flux obtained by the light modulator on a projection surface,
   the illumination system comprising:
      a light source configured to emit a light flux;
      a first lens array including a plurality of lenses configured to divide the light flux from the light source into a plurality of partial light fluxes;
      a second lens array including a plurality of lenses corresponding to the plurality of lenses included in the first lens array;
      a superimposing lens configured to cause the plurality of light fluxes emitted from the second lens array to be substantially superimposed on an illumination area; and
      a light flux contraction section disposed on an optical path between the light source and the illumination area, said light flux contraction section being configured to constitute an afocal optical system to change an incident light flux to an emitting light flux having a width narrower than a width of the incident light flux.

39. The projector according to claim 38, wherein the light flux contraction section includes a condenser lens and a diverging lens.

40. The projector according to claim 39, wherein the condenser lens is arranged separately from the first lens array.

41. The projector according to claim 39, wherein the condenser lens is optically integrated with the first lens array.

42. The projector according to claim 39, wherein the condenser lens and the first lens array comprises a decentered lens array.

43. The projector according to claim 39, wherein the diverging lens is arranged separately from the second lens array.

44. The projector according to claim 39, wherein the diverging lens is optically integrated with the second lens array.

45. The projector according to claim 39, wherein the diverging lens and the second lens array comprises a decentered lens array.

46. The projector according to claim 39, wherein the condenser lens is disposed between the light source and the first lens array, and the diverging lens and second lens array comprise a decentered lens array disposed between the first lens array and the superimposing lens.

47. The projector according to claim 38, wherein the light flux contraction section includes a first convex lens having a first focal length and a second convex lens having a second focal length shorter than the first focal length.

48. The projector according to claim 38, further comprising:
   a polarized light generator disposed at a specific position in the illumination system to convert light fluxes having random polarizing directions into one type of polarized light fluxes having a substantially identical polarizing direction and to emit the one type of polarized light fluxes.

49. The projector according to claim 48, wherein the polarized light generator comprises:
   a polarized light splitter configured to separate an incident light flux into two different types of polarized light fluxes having different polarizing directions; and
   a polarized light converter configured to convert the polarizing light direction of one type of polarized light flux identical with the polarizing direction of the other type of polarized light flux obtained by the polarized light converter.

50. The projector according to claim 49, further comprising:
   a color separator configured to divide the light flux emitted from the illumination system into at least two color light fluxes;
   a plurality of the light modulators configured to respectively modulate the color light fluxes separated by the color separator; and
   a color combiner configured to combine the modulated color light fluxes together after the modulation in the plurality of light modulators,
   wherein a composite light flux obtained by the color combiner is projected via the projection optical system.

* * * * *